United States Patent
Ishihara et al.

[11] 3,771,388
[45] Nov. 13, 1973

[54] FLUID CONTROL SYSTEM FOR AUTOMATIC VEHICLE TRANSMISSIONS

[75] Inventors: Tomoo Ishihara, Tokyo; Minoru Ohya, Toyota; Shin Ito; Fmihiro Ushijima, both of Toyota, all of Japan

[73] Assignee: Toyota Jidosha Kogyo Kabushiki Kaisha, Toyota-shi, Aichi-Ken, Japan

[22] Filed: Dec. 20, 1971

[21] Appl. No.: 209,712

[30] Foreign Application Priority Data
Dec. 21, 1970  Japan.............................. 45/114253

[52] U.S. Cl..................................... 74/861, 74/864
[51] Int. Cl............................................. B60k 21/00
[58] Field of Search...........74/861–865, 867–869; 137/81.5

[56] References Cited
UNITED STATES PATENTS

| | | | |
|---|---|---|---|
| 3,592,083 | 7/1971 | Kawabuta | 74/868 |
| 3,467,123 | 9/1969 | Perkins | 137/81.5 |
| 3,473,418 | 10/1969 | Ullery | 74/868 |
| 3,580,265 | 5/1971 | Horacek | 137/81.5 |
| 3,680,578 | 8/1972 | Davies | 137/81.5 |

*Primary Examiner*—Arthur T. McKeon
*Attorney*—Toren and McGeady

[57] ABSTRACT

A fluid control system for automatic vehicle transmissions comprising a gear transmission having variable change gear ratios, a hydraulic operating system adapted to drive servo mechanisms to effect selective gear change in said transmission, and a pneumatic control system adapted to produce pneumatic signals representative of vehicle operating conditions, said pneumatic signals being applied to control said hydraulic operating system. The hydraulic operating system comprises a plurality of valves adapted to regulate hydraulic fluid flow whereby to selectively operate the transmission servo mechanisms, and diaphragm elements for controlling operation of said valves in accordance with the pneumatic pressure signals from the pneumatic control system. The pneumatic control system comprises an engine output signal generator for producing a pneumatic pressure signal conforming to the engine output, a vehicle speed generator for producing a pneumatic pressure signal conforming to the vehicle speed, a kick-down signal generator for producing a pneumatic pressure signal to effect transmission downshift, a shift lever mechanism for producing a pneumatic pressure signal in conformity with the shift range setting position of the shift lever, and a fluid logic system containing logic elements into which these pneumatic pressure signals are applied as inputs and which will operate to develop appropriate output signals in response thereto to effect desired operation of the hydraulic operating system. The fluid logic system includes an automatic shift control mechanism consisting of a signal adjusting circuit and shift operating elements and adapted to effect automatic operation of the transmission when the shift lever is in "D" range in conformity with the relationship between the signal conforming to the engine output and the signal conforming to the vehicle speed. The fluid logic system also includes a manual shift control mechanism adapted to establish manual transmission control for each shift range other than "D" range. The pneumatic control system is designed to actuate the shift valves of the hydraulic operating system in conformity with the travelling condition of the vehicle.

17 Claims, 22 Drawing Figures

FLUID CONTROL SYSTEM FOR AUTOMATIC VEHICLE TRANSMISSIONS

BACKGROUND OF THE INVENTION

This invention relates to a control system for automatic transmissions of vehicles such as automobiles, in which gear shift is accomplished by using fluid elements operable by pneumatic pressure signals.

Generally, an automatic transmission comprises a transmission having variable change gear ratios, a friction engaging member consisting of clutches and band brakes for shifting said transmission, and hydraulic servo mechanisms for operating said clutches and brakes. The control system for selectively operating the hydraulic servo mechanisms of such automatic transmissions in conformity with gear shifting employs, as input signals, a signal representing the engine output and a signal representing the vehicle speed. These two signals are converted to hydraulic pressure signals in a hydraulic type shift control system and the shift pattern is calculated by means of hydraulic valves. Alternatively, the electric signals in an electric type shift control system may be utilized to calculate the shift pattern.

The above-mentioned hydraulic type control systems require a plurality of valves for calculating the shift pattern, resulting in a complicated construction. Furthermore, since the control action of the valve mechanisms is limited, the complicated, highly accurate control action required cannot be ensured. Although the electric type control systems are smaller in size than the hydraulic types and they may ensure improved accuracy of control action, such systems have a serious drawback in that they are susceptible to heat or vibration. Accordingly, when such electric type control systems are employed in automobiles or the like they are always subject to complicated vibration, and their reliability of operation cannot be ensured. Thus, the maintenance of such systems will be troublesome.

It is an object of the present invention to eliminate many of the serious drawbacks of hydraulic and electric type control systems by enabling adoption of a pneumatic type control system for vehicle transmission control.

SUMMARY OF THE INVENTION

Briefly, the present invention may be described as a vehicle transmission automatic control system comprising gear transmission means for applying power to drive a vehicle and operable to effect variable gear change ratios, hydraulic servo mechanisms operable to selectively change gear ratios in said transmission means, a hydraulic operating system including valve means shiftable in response to pneumatic signals for controlling operation of said hydraulic servo mechanisms and a pneumatic control system responsive to vehicle operating conditions to generate pneumatic signals which are applied to said hydraulic operating system for selectively controlling operation of said gear transmission means.

The pneumatic control system comprises an engine output signal generator and a vehicle speed signal generator each of which develop pneumatic signals which are representative, respectively, of the output of the vehicle engine and of the vehicle speed. These developed signals are compared in fluid logic means to which they are applied as inputs. Depending upon the relationship between the vehicle speed and the engine output, the fluid logic means, which also comprises part of the pneumatic control system, will generate output pneumatic signals for controlling operation of the hydraulic operating system. This form of operation occurs when the lever shift mechanism, which also operates as a part of the pneumatic control system, is in "D" range thereby effecting automatic operation of the transmission means.

The fluid logic means include an automatic shift control mechanism, which has the engine output and the vehicle speed pneumatic signals applied thereto as inputs, and a manual shift control mechanism, which has applied thereto as inputs the output from the automatic shift control mechanism and pneumatic control signals from the lever shift mechanism. When the lever shift mechanism is in "D" range, the manual shift control mechanism will pass the signals from the automatic shift control mechanism to the hydraulic operating system to effect selective control of the servo mechanisms during automatic operation of the transmission means. When the lever shift mechanism is in any other but "D" range, the manual shift control mechanism will block the signals from the automatic shift control mechanism and permit operation of the transmission means in accordance with the setting of the lever shift mechanism.

BRIEF DESCRIPTION OF THE DRAWINGS

The various features of novelty which characterize the invention are pointed out with particularity in the claims annexed to and forming a part of this disclosure. For a better understanding of the invention, its operating advantages and specific objects attained by its use, reference should be had to accompanying drawings and descriptive matter in which there are illustrated and described preferred embodiments of the invention.

DESCRIPTION OF THE PREFERRED EMBODIMENTS

Figure 1:
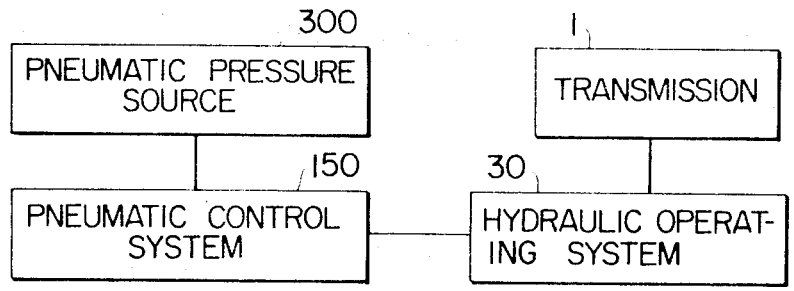
FIG. 1 is a schematic block diagram of the control system according to this invention.

Referring now to the drawings, the hydraulic control system according to this invention comprises a transmission 1 for changing speeds, a hydraulic operating system 30 for selecting the clutches or brake bands of the transmission 1, a pneumatic control system 150 for controlling the operation of shift valves of the hydraulic operating system 30 by means of pneumatic pressure signals, and a pneumatic pressure source 300 for producing pneumatic pressure signal by actuating the pneumatic control system 150.

Figure 2:
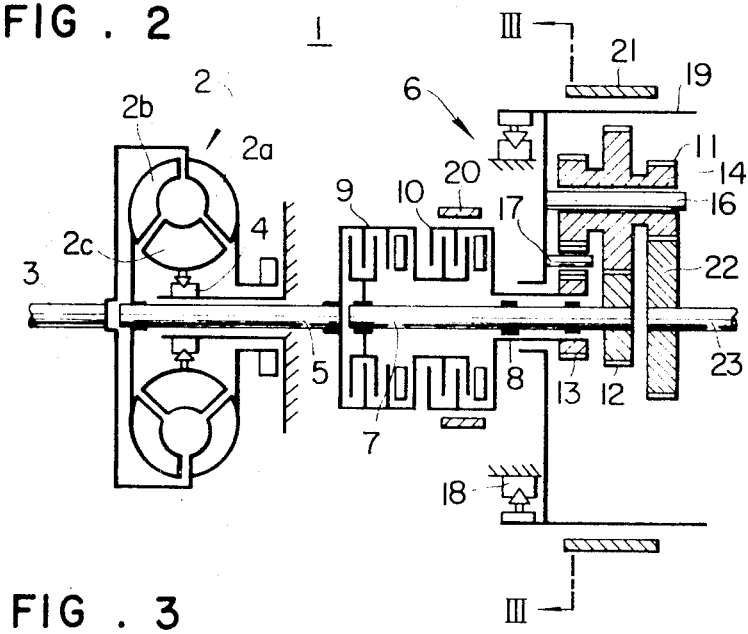
FIG. 2 is a schematic sectional diagram of a transmission to which the control system according to this invention is applied.
Figure 3:
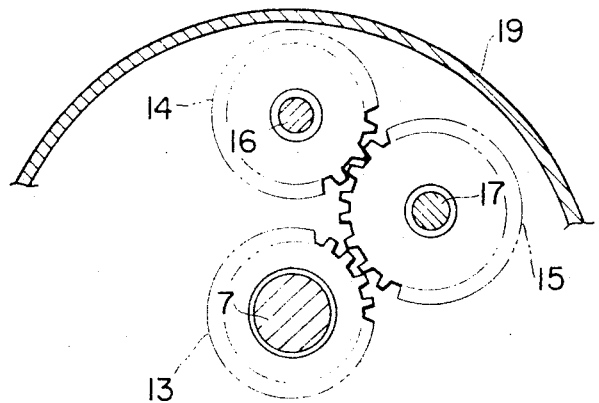
FIG. 3 is a sectional view, partly broken away, taken along the line III—III of FIG. 2.

First of all, the transmission 1 will be described with reference to FIGS. 2 and 3 illustrating a three forward speed and one reverse direction fluid type automatic transmission.

A torque converter 2 consists of a pump impeller 2a, a turbine runner 2b, and a stator 2c being supported by an one-way clutch 4. The pump impeller 2a is connected to an engine crank-shaft 3, and the turbine runner 2b is connected to a turbine shaft 5 which is an input shaft of a gear unit mechanism 6, thus transmitting input rotation from the crank-shaft 3 to the turbine shaft 5.

The gear unit mechanism 6 comprises the turbine shaft 5, two intermediate shafts 7 and 8, two clutches 9 and 10. a planetary gear mechanism 11, two brake bands 20 and 21, and an output shaft 23. A front clutch 9 is provided between the turbine shaft 5 and the first intermediate shaft 7. A rear clutch 10 is located between the turbine shaft 5 and the second intermediate shaft 8.

The first intermediate shaft 7 is connected to an input sun gear 12 of a planetary gear mechanism 11. The second intermediate shaft 8 is connected to a reverse sun gear 13 of said planetary gear mechanism 11, and is provided with a front brake band 20 in engaging relationship therewith. In addition to said input sun gear 12 and reverse sun gear 13, the planetary gear mechanism 11 comprises a planetary pinion 14 to be meshed with the input sun gear 12, an idler gear 15 to be meshed with with the reverse sun gear 13 and the planetary pinion 14, and pins 16 and 17 for rotatably supporting the planetary pinion 14 and the idler gear 15. Said two pins 16 and 17 are connected by means of a carrier 19 being supported by a one-way clutch 18. Around the carrier 19 there is provided the rear brake band 21. The planetary pinion 14 of the planetary gear mechanism 11 is connected through a gear 22 to the output shaft 23. Thus, the front and rear clutches 9 and 10 releasably connect the turbine shaft 5 to the first intermediate shaft 7 or the second intermediate shaft 8. The front and rear brake bands 20 and 21 stop the rotation of the second intermediate shaft 8 or the carrier 19.

The operation of the gear unit mechanism 6 of the above-described construction in each shifting range is tabulated in Table 1 with respect to the operation of the clutches 9 and 10 and the brake bands 20 and 21. In Table 1, figures correspond to the reference numerals of clutches and brake bands which are illustrated in the accompanying drawings. The Mark " X " indicates that the clutch or brake band is in operation.

TABLE 1

| Shifting range | 9 | 10 | 20 | 21 |
|---|---|---|---|---|
| First Gear | X | | | (X) |
| Second Gear | X | | X | |
| Third gear | X | X | | |
| Reverse | | X | | X |

The operation of the gear unit mechanism 6 in each shifting range will be described hereinbelow with reference to Table 1.

In the first gear range, the front clutch 9 and the brake band 21 are engaged. Thus, the input rotation from the turbine shaft 5 is transmitted through the first intermediate shaft 7 to the input sun gear 12 of the planetary gear mechanism 11. At this time, the rotation of the carrier 19 is restricted by the rear brake band 21, and therefore the pin 16 is in the fixed condition. Accordingly, the rotation from the input sun gear 12 is transmitted through the planetary pinion 14 and the gear 22 to the output shaft 23. In this condition the brake band 21 need not be engaged owing to the one-way clutch 18 in operation.

In the second gear range, the front clutch 9 continues to operate. However, the front brake band 20 will engage instead of the rear brake band 21. Thus, the input rotation from the turbine shaft 5 is transmitted to the input sun gear 12 of the planetary gear mechanism 11 in the same manner as described above. Then, the rotation of the reverse sun gear 13 is restricted by the front brake band 20. Accordingly, the idler gear 15 is rotated through the planetary pinion 14 in the same direction because of the rotation of the input sun gear 12. As a result, the planetary pinion 14 and the idler gear 15 revolve in the same direction along the fixed reverse sun gear 13. This revolution is transmitted through the gear 22 to the output shaft 23.

In the third gear range, both the front and rear clutches 9 and 10 are engaged. Thus, the input rotation from the turbine shaft 5 is transmitted to the input sun gear 12 of the planetary gear mechanism 11 in the same manner as described above. At the same time, the input rotation is transmitted by means of the rear clutch 10 through the second intermediate shaft 8 to the reverse sun gear 13. Accordingly, the input sun gear 12 and reverse sun gear 13 rotate in the same direction. Thus, the planetary gear mechanism 11 operates in a single body without allowing separate planetary rotation. As a result, the rotation of the turbine shaft 5 is transmitted to the output shaft 23 without being decelerated.

In the reverse range, the rear clutch 10 and the rear brake band 21 will operate. Thus, the input rotation from the turbine shaft 5 is transmitted to the reverse sun gear 13 of the planetary gear mechanism 11. In the same manner as in the first gear range, the rotation of the carrier 19 is restricted by the rear brake band 21. Accordingly, the pins 16 and 17 are fixed together with the carrier 19. Due to the rotation of the reverse sun gear 13, the planetary pinion 14 is rotated through the idler gear 15 in the same direction. However, this rotation is reversed by the gear 22 and is transmitted to the output shaft 23.

As described hereinbefore, the transmission 1 transmits engine power by means of the torque converter 2 and effects necessary change in gear ratio for three forward speeds and one reverse direction by selectively operating the clutches 9 and 10 and the brake bands 20 and 21 of the gear unit mechanism 6.

Referring now to FIGS. 4 through 9, the hydraulic operating system 30 comprises a hydraulic pressure regulating unit 31 which supplies hydraulic oil to the torque converter 2 and lubricating oil to each component of the gear unit mechanism 6 and further supplies appropriate pressure oil to a hydraulic operating unit 60 to be described later. Furthermore, the hydraulic operating system 30 comprises the hydraulic operating unit 60 which selectively actuates hydraulic servos 9', 10', 20' and 21' of said clutches 9, 10 and brake bands 20, 21 in the gear unit mechanism 6.

The hydraulic pressure regulating unit 31 comprises an oil basin 32, an oil pump 33, a pressure regulator valve 34 and a diaphragm element 50 for controlling the operation of said pressure regulator valve 34. The pressure regulator valve 34 is provided with a spring 35 at the back thereof, into which a valve spool 36 is movably inserted. Furthermore, the pressure regulator valve 34 comprises an oil chamber 38 which establishes or interrupts communication between the oil pump 33 and the torque converter 2 through an oil passage 37, a pressure discharge oil passage 39, an oil chamber 41 which establishes or interrupts communication between the oil pump 33 and the hydraulic operating unit 60 to be described later through an oil passage 40, and an oil chamber 44 which is brought into communication with the oil passage 40 through an orifice 43 provided on an oil passage 42 and is located at a position opposite to the springs 35 of the valve spool 36. The interior of the diaphragm element 50 is divided into two air chambers 53 and 54 by means of a diaphragm 52 having a spring 51 at the back thereof. Said two air chambers 53 and 54 are provided with feed ports 55 and 56, respectfully, which are connected to the pneumatic control system 150, to be described later, and into which a pneumatic pressure signal proportional to the engine output as well as a pneumatic pressure signal proportional to the vehicle velocity are directed. Moreover, a rod 57 is provided between said diaphragm 52 and said valve spool 36 of the pressure regulator valve 34.

Figure 10:
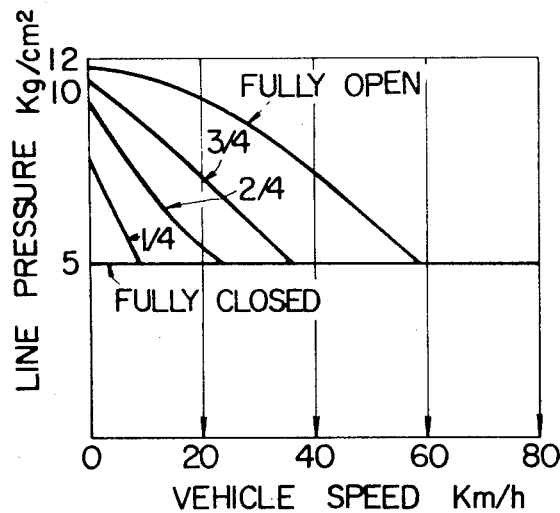
FIG. 10 is a diagram showing the relationship between the line pressure of the hydraulic operating system and the vehicle speed and using the throttle opening as a parameter.

Thus, in the hydraulic pressure regulating unit 31, the force of the spring 35 and the force developed due to the difference between the pneumatic pressure signals in both said air chambers of the diaphragm element 50 are applied to one side of the valve spool 36 of the pressure regulator valve 34. The hydraulic pressure from the oil chamber 44 is applied to the opposite side of the valve spool 36. The line pressure of the oil passage 40 is determined by the movement of the valve spool 36 in conformity with the relationship between the above-mentioned actions. The relationship between the line pressure, vehicle speed and engine output, that is, throttle opening, is depicted in the characteristic diagram of FIG. 10. When the vehicle speed is high and the throttle opening is small, the diaphragm 52 in the diaphragm element 50 is deflected upward by means of the pneumatic signals proportional to the vehicle speed and throttle opening, thus reducing the force produced by the rod 57 to almost zero. Accordingly, the valve spool 36 in the pressure regulator valve 34 is moved upward by means of the hydraulic pressure in the oil chamber 44, overcoming the tension of the spring 35. Thus, the oil chamber 41 is brought into communication and the hydraulic pressure is also directed into the discharge pressure oil passage 39, as a result of which the line pressure in the oil passage 40 is partly discharged to decrease the pressure. If the vehicle velocity is low and the throttle opening is large, the diaphragm 52 of the diaphragm element 50 is deflected downward and the valve spool 36 is pressed by the rod 57. Accordingly, the valve spool 36 of the pressure regulator valve 34 is moved downward to close the pressure discharge oil passage 39 and to increase the line pressure in the oil passage 40.

The hydraulic operating unit 60 comprises a first shift valve 61, a diaphragm element 80 for controlling the operation of said first shift valve 61, a second shift valve 90, a diaphragm element 110 for controlling the operation of said second shift valve 90, a third shift valve 120, and a diaphragm element 140 for controlling the operation of the third shift valve 120.

The first shift valve 61 and the diaphragm element 80 will be first described. The first shift valve 61 is provided with a spring 62 at the back thereof, into which a valve spool 63 is movably inserted. Furthermore, the first shift valve 61 comprises an operating oil chamber 64 located at a position opposite to the spring 62, an oil passage 66 which is brought into communication with said oil chamber 64 and is provided with an orifice 65, a pressure discharge oil passage 67, an oil chamber 69 which establishes or interrupts communication between oil passage 67 or oil passage 40 and a hydraulic servo 9' through an oil passage 68 an oil chamber 71 which establishes or interrupts communication between the oil passage 40 running from the hydraulic pressure regulating unit 31 or oil passage 72 and the third shift valve 120 through the oil passage 70, another pressure discharge oil passage 72, and an oil passage 73 which is branched from the oil passage 40 and is connected to the oil passage 66. The diaphragm element 80 is divided into two air chambers 83 and 84 by means of a diaphragm 82. The air chamber 83 only is provided with a feed port 85 which is connected to the pneumatic control system 150, to be described later, for obtaining the pneumatic pressure signal. Another air chamber 84 is provided with a slidable pivot valve 86 having a spring 81 at the back thereof and being contacted to the diaphragm 82. Said valve 86 is provided so as to open or close an orifice 88 which is branched from said oil passage 66 and is connected to a pressure discharge oil passage 87.

Thus, the first shift valve 61 is operated by means of the pneumatic pressure signal of the diaphragm element 80. When no pneumatic pressure signal is applied to the air chamber 83 of the diaphragm element 80, the diaphragm 82 is deflected upward due to the force of the spring 81, thus separating the pivot valve 86 from the orifice 88. Accordingly, the line pressure to be supplied from the oil passage 40 through the oil passages 73 and 66 is discharged through the pressure discharge oil passage 87 and is not applied to the operating chamber 64 of the first shift valve 61. Therefore, The valve spool 63 in the first shift valve 61 is moved upward by the force of the spring 62 and brings the hydraulic servo 9' into communication with the pressure discharge oil passage 67. Thus, the oil passage 40 is brought into communication with the oil passage 70. When the pneumatic pressure signal is applied to the diaphragm element 80, the pivot valve 86 closes the orifice 88 to shut off the pressure discharge oil passage 87, and therefore the line pressure is applied to the operating oil chamber 64 of the first shift valve 61. The valve spool 63 is moved downward, overcoming the tension of the spring 62, thus establishing the communication between the passage 40 and the hydraulic servo 9'. At the same time, the oil passage 70 is brought into communication with the pressure discharge oil passage 72.

Next, the second shift valve 90 and the diaphragm 110 will be described. The second shift valve 90 is provided with a spring 92 at the bottom thereof, and a valve spool 93 which is movably inserted therein. Furthermore, the second shift valve 90 comprises an operating oil chamber 94 for receiving operating hydraulic pressure which is applied to the spool 93 at a side opposite to said spring 92, an oil passage 96 which is brought into communication with the oil chamber 94 and is provided with an orifice 95, a pressure discharge oil passage 97, and oil chamber 99 which establishes or interrupts communication between the pressure discharge oil passage 97 or oil passage 68 and the hydraulic servo 20' through an oil passage 98, an oil chamber 102 which establishes or interrupts communication between an oil passage 105 connected to servo 21' and the third shift valve 120 through an an oil passage 101, an oil chamber 105 which establishes or interrupts communication between the hydraulic servo 21' connected to an oil passage 103 and a pressure discharge oil passage 104 or oil passage 102, and an oil passage 106 which is branched from the oil passage 73 and is connected to the oil passage 96. The diaphragm element 110 is constructed in the same manner as the above-described diaphragm element 80. That is, said diaphragm element 110 comprises a diaphragm 112, air chambers 113 and 114, a feed port 115 for introducing pneumatic pressure signals, a pivot valve 116 having a spring 111 at the back thereof, and a pressure discharge oil passage 117 which is brought into communication with the oil passage 96 through an orifice 118 operable by the pivot valve 116.

Thus, the second shift valve 90 is also operated by the pneumatic pressure signal of the diaphragm element 110. When the pneumatic pressure signal is not applied to the diaphragm element 110, the pivot valve 116 opens the orifice 118, thus interrupting the application of the line pressure to the operating oil chamber 94 of the second shift valve 90. Accordingly, the valve spool 93 in the second shift valve 90 is moved upward to establish communication between the hydraulic servo 20' and pressure discharge oil passage 97 and between the hydraulic servo 21' and the oil passage 101. When the pneumatic pressure signal is applied to the diaphragm element 80, the pivot valve 116 closes the orifice 118, thus applying the line pressure to the operating oil chamber 94 of the second shift valve 90. Accordingly, the valve spool 93 in the second shift valve 90 is moved downward to establish communication between the oil passage 100 and the hydraulic servo 20' and between the hydraulic servo 21' and the pressure discharge oil passage 104.

The third shift valve 120 is constructed in the same manner as the above-described second shift valve 90. That is, the third shift valve 120 comprises a spring 122, a valve spool 123, an operating oil chamber 124, an oil passage 126 provided with the orifice 125, an oil chamber 128 which establishes or interrupts communication between an oil passage 127 branched from the oil passage 68 and the oil passage 101, an oil chamber 130 which establishes or interrupts communication between the oil passage 70 and an oil passage 101 from the second shift valve 90, and an oil chamber 133 which establishes or interrupts communication between an oil passage 131 branched from the oil passage 70 or oil passage 129 and the releasing side of the hydraulic servo 20' as well as an oil passage 132 of the hydraulic servo 10'. The diaphragm element 140 is also constructed in the same manner as described hereinbefore. That is, the diaphragm element 40 comprises a diaphragm 142, air chambers 143 and 144, a feed port 145 for obtaining pneumatic pressure signals, a pivot valve 146 having a spring 141 at the back thereof and a pressure discharge oil passage 147 which is brought into communication with the oil passage 126 through an orifice 148 operable by the pivot valve 146.

Thus, a third shift valve 120 is also operated by the pneumatic pressure signal of the diaphragm element 140. When the pneumatic pressure signal is not applied to the diaphragm element 140, the valve spool 123 of the third shift valve 120 is moved upward to establish communication between the oil passage 127 and the oil passage 101 and between the oil passage 129 and the releasing side of the hydraulic servo 20' as well as the hydraulic servo 10'. When the pneumatic pressure signal is applied to the diaphragm element 140, the valve spool 123 of third shift valve 120 is moved downward to establish communication between the oil passage 70 and the oil passage 101 and between the oil passage 131 and the releasing side of the hydraulic servo 20' as well as the hydraulic servo 10'.

The operation of the above-described hydraulic operating unit 60 in each shifting range with respect to the application of the pneumatic pressure signals to the diaphragm elements 80, 110 and 140 is shown in Table 2. In this Table, the figures represent the reference numeral of each diaphragm element. The words "ON" and "OFF" should be understood to mean "pneumatic pressure signal applied" and "no pneumatic pressure signal applied," respectively.

TABLE 2

|  | 80 | 110 | 140 |
| --- | --- | --- | --- |
| N range | OFF | OFF | OFF |
| D range |  |  |  |
| 1st gear | ON | OFF | ON |
| 2nd gear | ON | ON | ON |
| 3rd gear | ON | ON | OFF |
| 2 range |  |  |  |
| ON |  | ON | ON |

| | | | |
|---|---|---|---|
| L range | ON | OFF | OFF |
| R range | OFF | OFF | ON |

Based on Table 2, the operation of the hydraulic operating unit 60 in each range will be described with reference to FIGS. 4 through 9.

Figure 4:
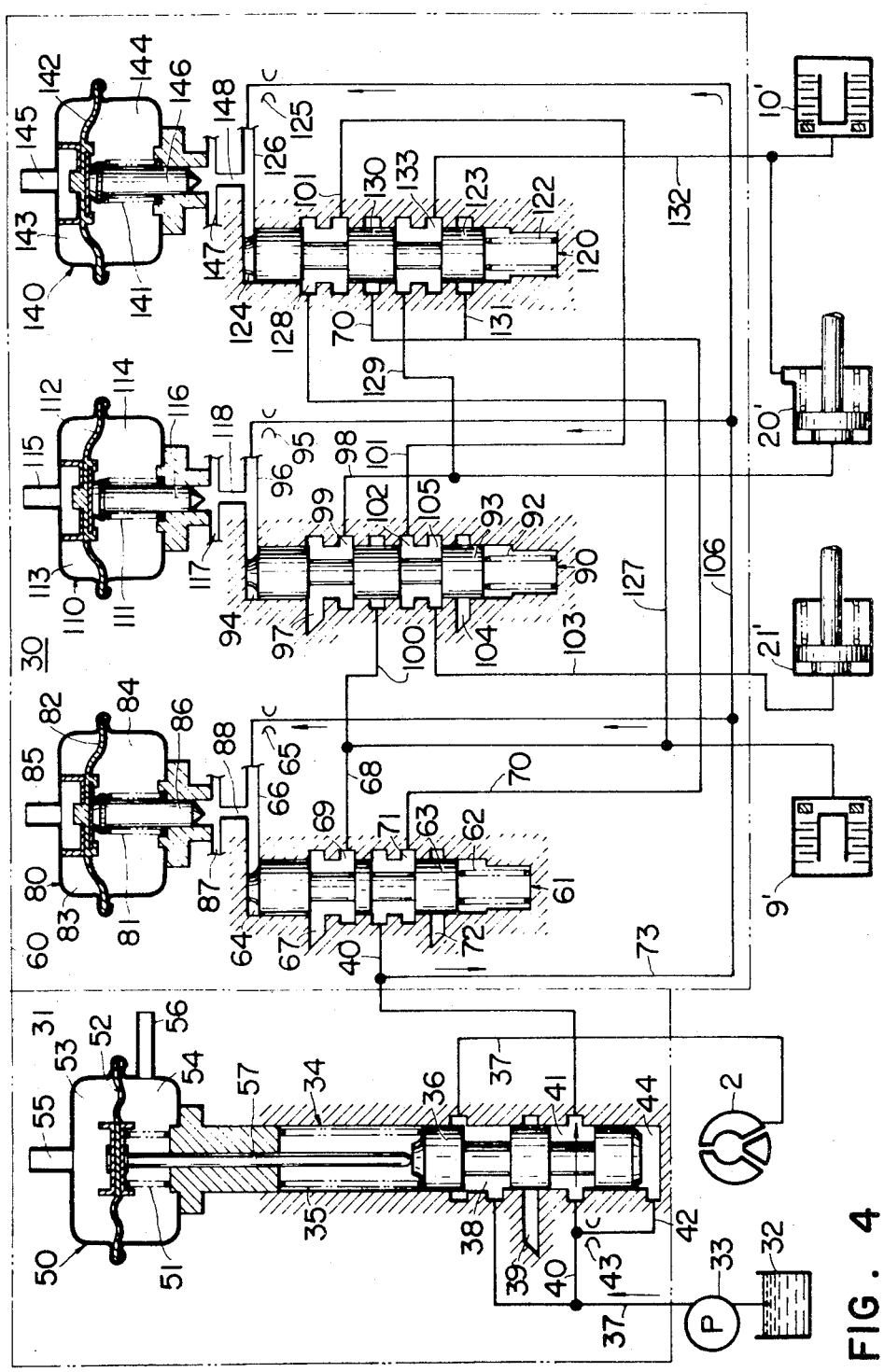
FIG. 4 is a schematic sectional view illustrating the hydraulic operating system of the present invention in "N" range.

Referring now to FIG. 4, no pneumatic pressure signal exists at any of the diaphragm elements 80, 110 and 140 when the gear is shifted to "N" range. Accordingly, the valve spools 63, 93 and 123 of the shift valves 61, 90 and 120, respectively, are moved upward. Thus, the pressure is discharged from the hydraulic servo 9' by means of the first shift valve 61. Also, the pressure is discharged from the hydraulic servo 20' by means of the second shift valve 90. Furthermore, the pressure is discharged from the hydraulic servo 21' through the establishment of communication between the oil passage 103 and the oil passage 101 by means of the second shift valve and between the oil passage 101 and the oil passage 127 by means of the third shift valve 120. (The pressure is discharged from the hydraulic servo 10' through the oil passage 132, 129 by the second shift valve.) Thus, in this range, the clutches 9 and 10 and the brake bands 20 and 21 of the gear unit mechanism 6 are all released, and therefore they are separated from the turbine shaft 5.

Figure 5:
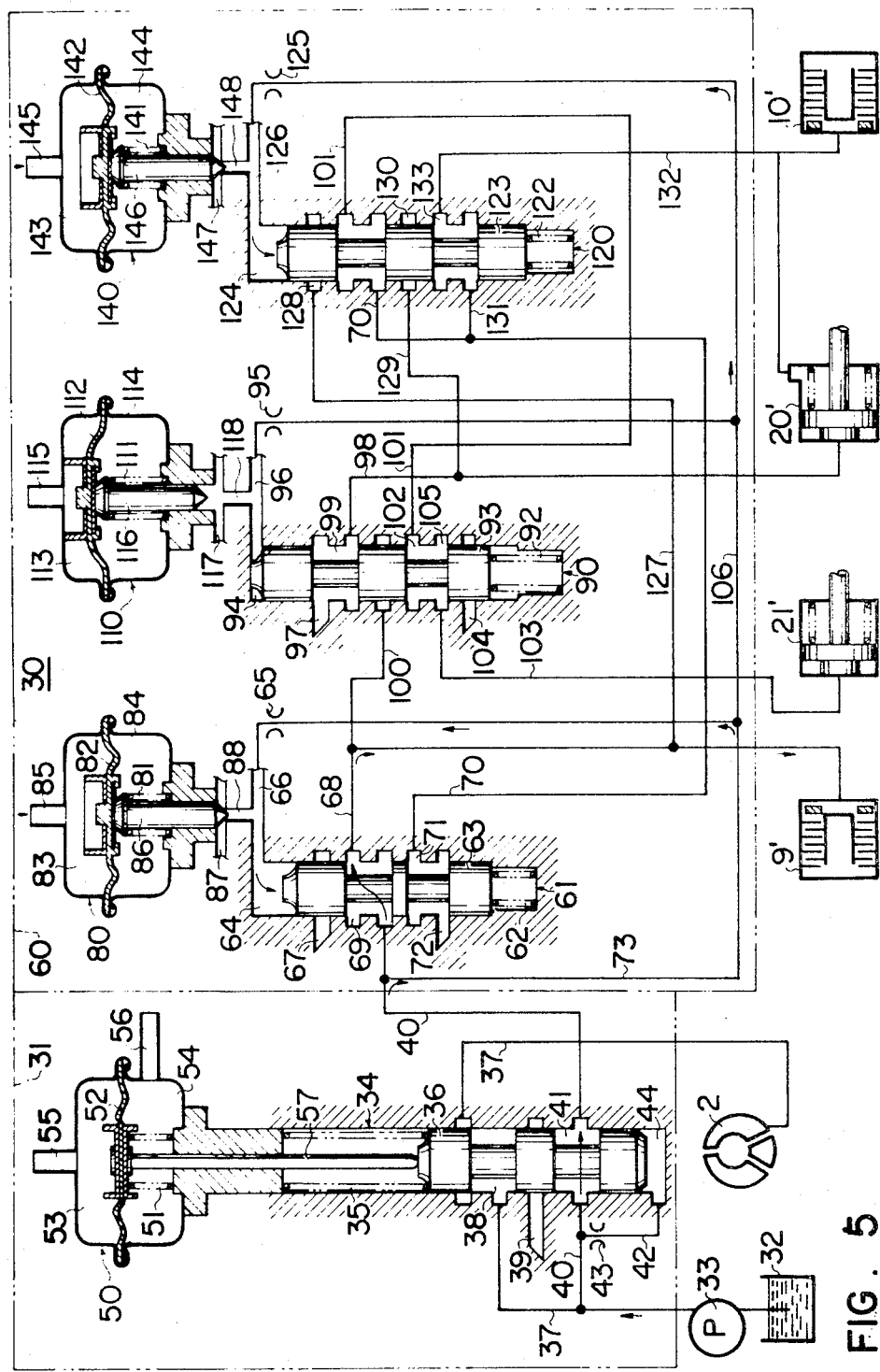
FIG. 5 is a schematic sectional view illustrating the hydraulic operating system in "D" range first gear.

Referring to FIG. 5, in "D" range first gear, the pneumatic pressure signal exists at the diaphragm elements 80 and 140, but not at the diaphragm element 110. Accordingly, the valve spools 63 and 123 of the first shift valve 61 and the third shift valve 120, respectively, are moved downward, and the valve spool 93 of the second shift valve 90 is located upward. As a result, the line pressure is supplied to the hydraulic servo 9' by means of the first shift valve 61. However, the pressure is discharged from the hydraulic servo 20' by means of the second shift valve 90. Furthermore, the pressure is discharged from the hydraulic servos 10' and 21' through the establishment of communication between the oil passage 133 and the oil passage 131 and between the oil passage 101 and and the oil passage 70 by means of the third shift valve 120. Thus, in this range, the front clutch 9 of the gear unit mechanism 6 is in operation, but the rear clutch 10 and the brake bands 20 and 21 are released. In this case, as the rear brake band 21 is not operated, the engine brake is not effective.

Figure 6:
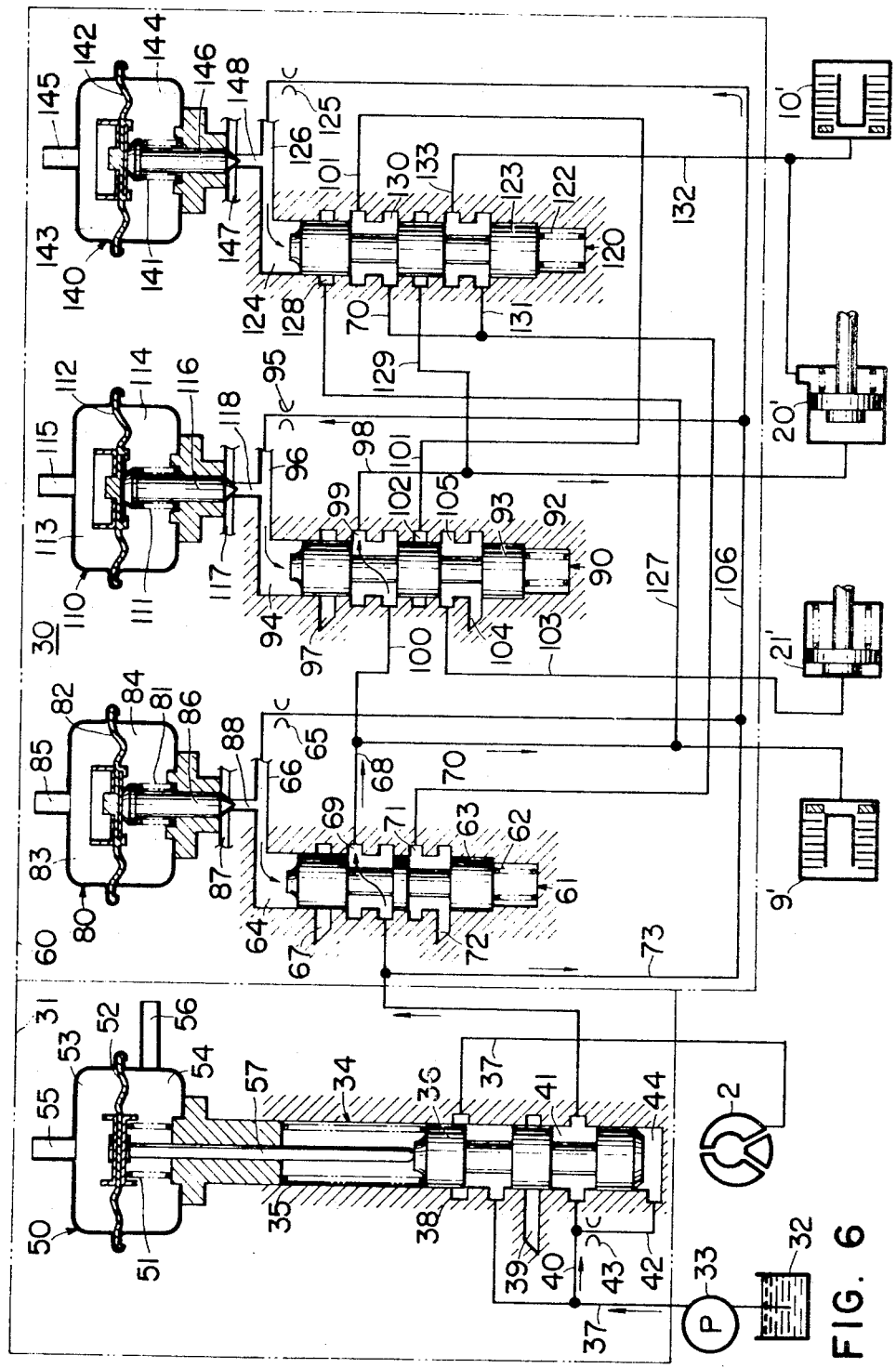
FIG. 6 is a schematic sectional view illustrating the hydraulic operating system in "D" range second gear.

Referring next to FIG. 6, in "D" range second gear, the pneumatic pressure signal exists at all of the diaphragm elements 80, 110 and 140. Accordingly, the valve spools 63, 93 and 123 of the shift valves 61, 90 and 120, respectively, are all situated downward. The line pressure is supplied to the hydraulic servo 9' in the same manner as in the first gear range. The line pressure is also supplied to the hydraulic servo 20' by means of the second shift valve 90. At the same time, the pressure is discharged from the hydraulic servo 21' by means of the second shift valve 90. In the same manner as in the first gear, the pressure is discharged from the hydraulic servo 10' by means of the third shift valve 120. Thus, in this range, the front clutch 9 and the front brake band 20 of the gear unit mechanism 6 are in operation, and the rear clutch 10 and the brake band 21 are released.

Figure 7:
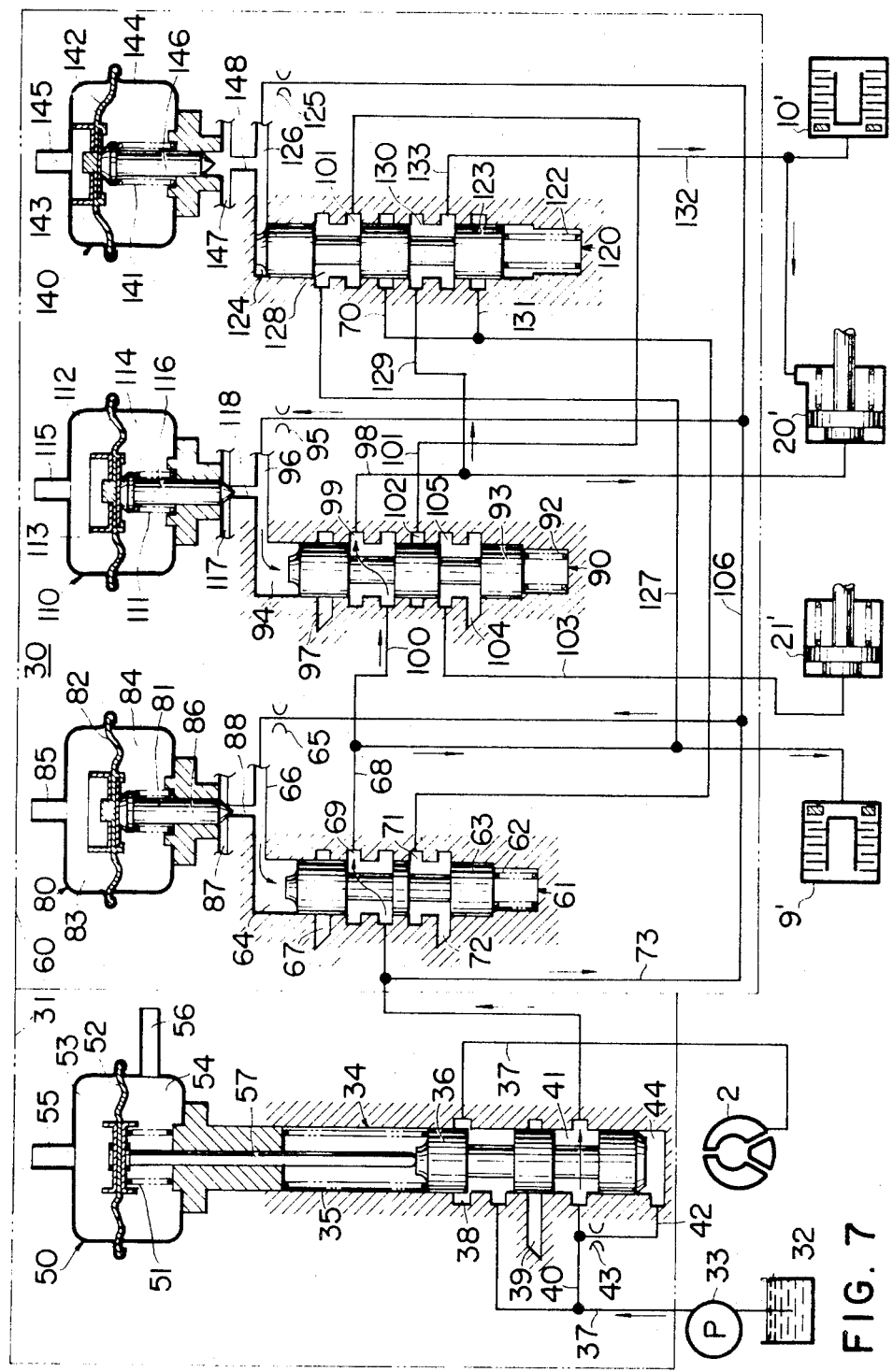
FIG. 7 is a schematic sectional view illustrating the hydraulic operating system in "D" range third gear.

Referring now to FIG. 7, in "D" range third gear, the pneumatic pressure signal exists at the diaphragm elements 80 and 110 but not at the diaphragm element 140. Accordingly, the valve spools 63 and 93 of the first shift valve 61 and the second shift valve 90, respectively, are situated downward, but the valve spool 123 of the third shift valve 120 is situated upward. As a result, the line pressure is supplied to the hydraulic servo 9' in the same manner as in the first gear. The line pressure is also supplied to the hydraulic servo 10' by means of the third shift valve 120. At this time, the line pressures are supplied to the operating side and the releasing side of the hydraulic servo 20' through the oil passages 98 and 132. However, these pressures cancel each other, resulting in a nonoperative condition. Accordingly, the pressure is discharged from the hydraulic servo 21' in the same manner as when in the second gear. Thus, in this range, the clutches 9 and 10 of the gear unit mechanism 6 are operated and the brake bands 20 and 21 are released.

In the case of "2" range (not shown), the pneumatic pressure signal exists at all of the diaphragm elements 80, 110 and 140 in the same manner as in the above-described "D" range second gear. The same shifting operation as described above is accomplished, thus bringing the front clutch 9 and the brake band 20 of the gear unit mechanism 6 into operation.

Figure 8:
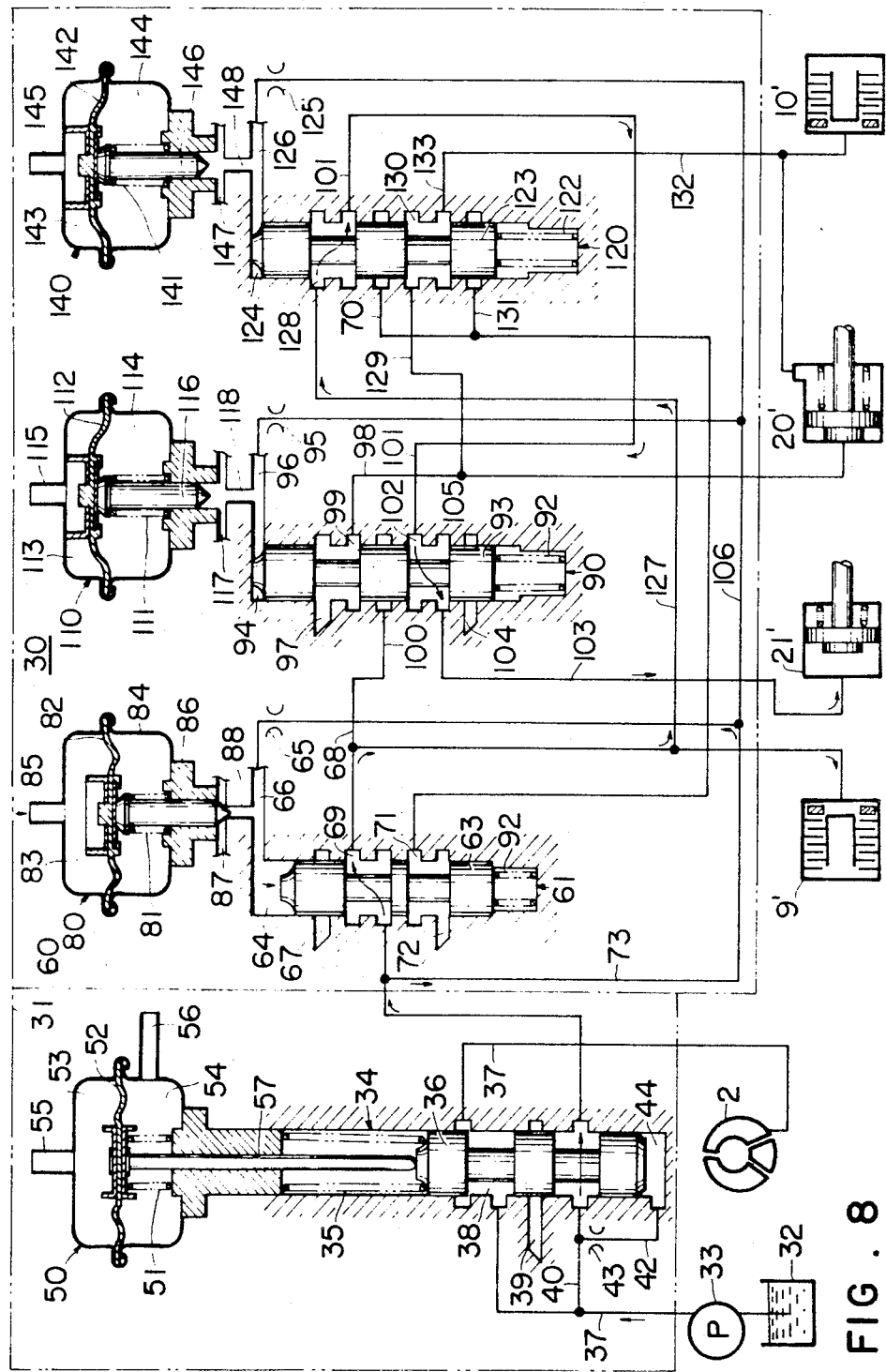
FIG. 8 is a schematic sectional view illustrating the hydraulic operating system in "L" range.

Referring now to FIG. 8, in "L" range, the pneumatic pressure signal exists only at the diaphragm element 80, but not at the diaphragm elements 110 and 140. Accordingly, the valve spool 63 of the first shift valve 61 is situated downward, but the valve spools 93 and 123 of the second and third shift valves 90 and 120 are located upward. As a result, the line pressure is supplied to the hydraulic servo 9' in the same manner as in "D" range first gear. As communication is established between the oil passage 127 and the passage 101 by means of the third shift valve 120 and between the oil passage 103 and the oil passage 101 by means of the second shift valve 90, the line pressure is also supplied to the hydraulic servo 21'. Thus, the pressure is discharged from the hydraulic servo 20' in the same manner as in "D" range first gear. Furthermore, the pressure is discharged from the hydraulic servo 10' by means of the third shift valve 120. Thus, in this range, the clutch 9 and the rear brake band 21 of the gear unit mechanism 6 are operated, allowing speed change in the same manner as in "D" range first gear. In this case, the engine brake becomes effective.

Figure 9:
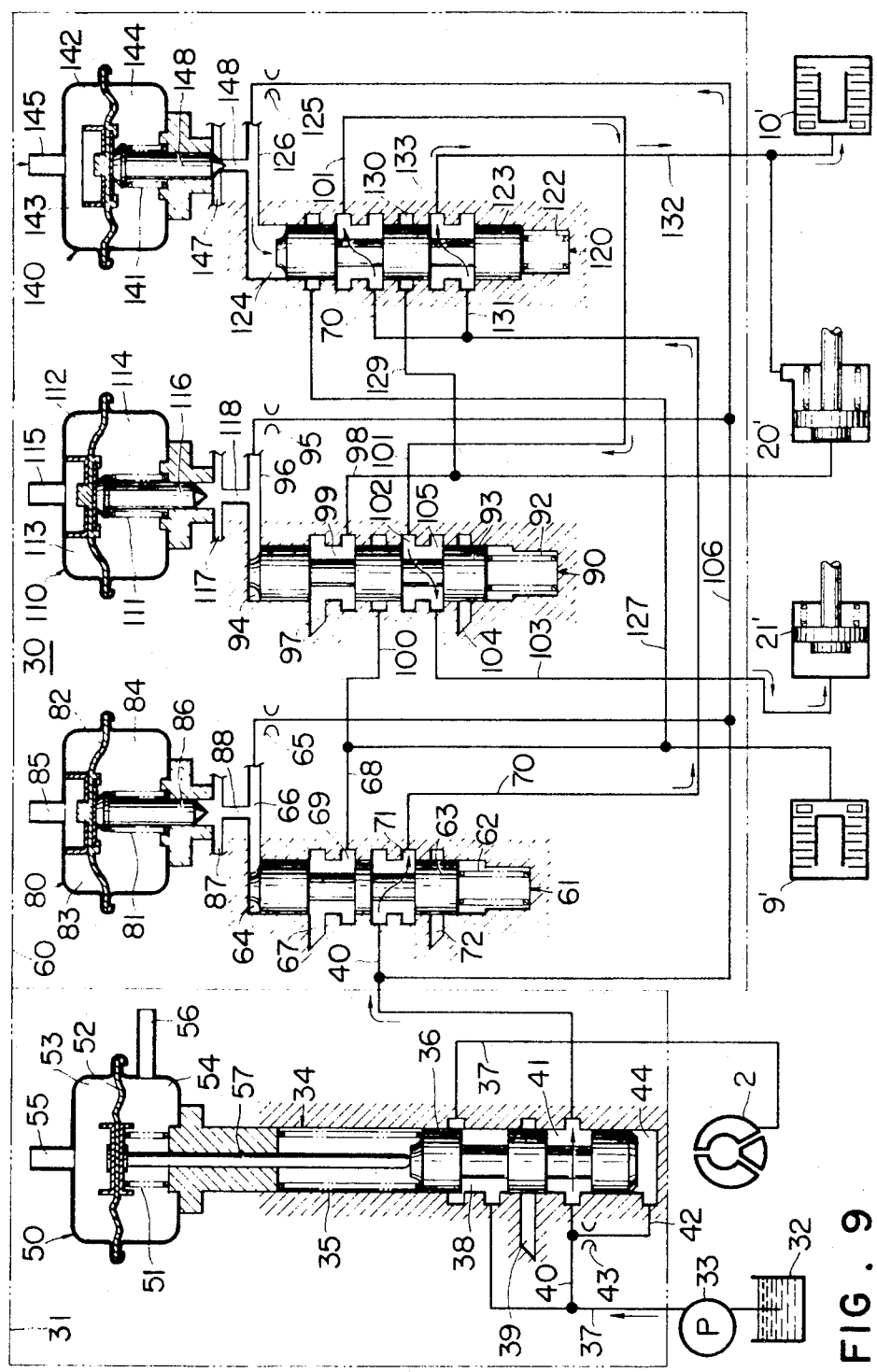
FIG. 9 is a schematic sectional view illustrating the hydraulic operating system in "R" range.

Referring now to FIG. 9, in "R" range, the pneumatic pressure signal exists at the diaphragm element 140 only but not at the diaphragm elements 80 and 110. Accordingly, the valve spools 63 and 93 of the first and second shift valves 61 and 90 are situated upward, but the valve spool 123 of the third shift valve 120 is located downward. As a result, the pressure is discharged from the hydraulic servos 9' and 20' in the same manner as in "N" range. However, the line pressure is supplied to the hydraulic servo 21' as communication is established between the oil passage 40 and the oil passage 70 by means of the first shift valve 61 and between the oil passage 70 and the oil passage 101 by means of the third shift valve 120 and between the oil passage 101 and the oil passage 103 by means of the second shift valve 90. Also, the line pressure is supplied to the hydraulic servo 10' as the oil passage 131 is brought into communication with the oil passage 133 by means of the third shift valve 120. Thus, in this range, the rear clutch 10 and the rear brake band 21 of the gear unit mechanism 6 are operated, but the front clutch 9 and the brake band 20 are released.

As described above, the hydraulic operating system 30 regulates the line pressure by means of the pneumatuc pressure signal conforming to the engine output and vehicle speed, and shifts the hydraulic servos in accordance with the existence of the pneumatic pressure signal.

Referring now to FIGS. 11 through 22, there will be described the pneumatic control system 150 adapted to produce the pneumatic pressure signal conforming to the engine output and vehicle speed and to turn on and off the pneumatic pressure signal for accomplishing shifting operation. The pneumatic pressure source 300 will be described together with the pneumatic control system 150.

Figure 11:
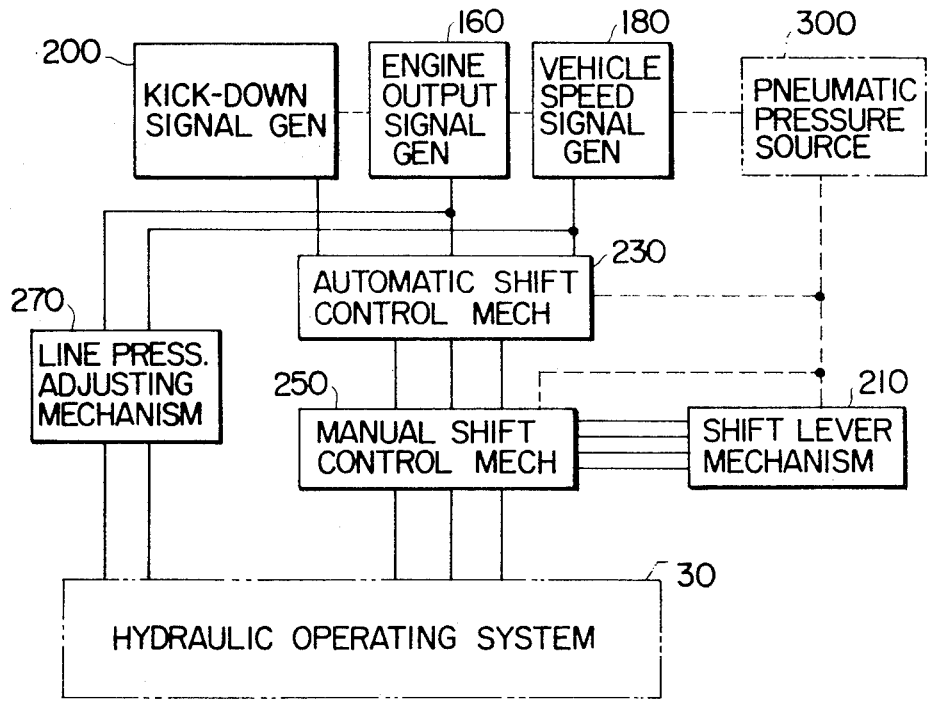
FIG. 11 is a schematic block diagram of the pneumatic control system of the invention.

Referring first to FIG. 11, the pneumatic control system 150 comprises an engine output signal generator 160 for producing the pneumatic pressure signal conforming to the engine output, a vehicle speed signal generator 180 for producing the pneumatic pressure signal conforming to the vehicle speed, a kick-down signal generator 200 for producing the pneumatic pressure signal of kick-down, a shift lever mechanism 210 for producing the pneumatic pressure signal conforming to the shifting range setting position of the shift lever, an automatic shift control mechanism 230, a manual shift control mechanism 250 and a line pressure adjusting mechanism 270.

Figure 12:
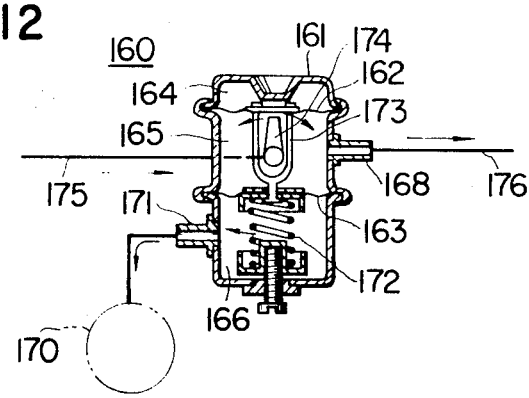
FIG. 12 is a sectional view illustrating an engine output signal generator.

Referring now to FIG. 12, a body 161 of the engine output signal generator 160 is divided into three air chambers 164, 165 and 166 by means of the diaphragms 162 and 163. A small hole of 1 mm in diameter is made in the first diaphragm 162, thereby to equalize the pneumatic pressures in the first and second air chambers 164 and 165. The second air chamber 165 is provided with a pneumatic pressure outlet 168 which is connected to an air passage 176. The third air chamber 166 is provided with an engine negative pressure supply port 171 which is connected to an engine intake manifold 170.

The second diaphragm 163 is provided with a spring 172 at the back thereof on the side of the third air chamber 166 to oppose the engine intake negative pressure. Furthermore, a member 173 is provided between the first diaphragm 162 and the second diaphragm 163 and is connected to the second diaphragm 162 so that they can operate integrally. In the second air chamber 165, a nozzle 174 connected to the pneumatic pressure source 300 through an air passage 175 and adapted to inject air is provided so as to be opened or closed by the movement of the first diaphragm 162. Thus, the engine output signal generator 160 derives the pneumatic pressure signal in accordance with the negative pressure of the engine intake manifold 170 which is almost equal to the engine torque. Let the negative pressure be $Pv$; the cross sectional area of the second diaphragm 163, $A$; and the constant of the spring 172, $K$. Then, the pneumatic pressure $PE$ conforming to the engine output will be expresses as follows:

$$PE = (K/A) + Pv$$

As is apparent from this formula, if the negative pressure is high, the second diaphragm 163 is drawn in the third air chamber 166, overcoming the tension of the spring 172. Accordingly, the first diaphragm 162 is deflected downward through the member 173 to throttle the outlet of the nozzle 174, thus obtaining a lower pneumatic pressure signal at the outlet 168. When the negative pressure is low, the outlet of the nozzle 174 is opened by the first diaphragm 162, thus obtaining a higher pneumatic pressure signal at the outlet 168. Thus, this embodiment of the engine output signal generator 160 utilizes the engine intake manifold negative pressure as the engine output and converts it to the pneumatic pressure signal by means of the diaphragm elements. Alternative means, such as a device utilizing the displacement of accelerator pedal as an indication of the engine output, may be utilied instead as the signal generator 160 in keeping with the present invention.

Figure 13:
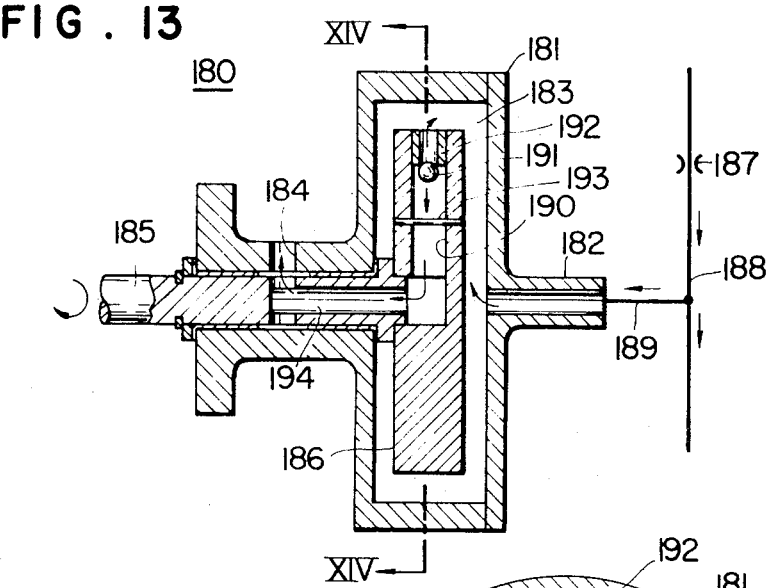
FIG. 13 is a sectional view of a vehicle speed signal generator.
Figure 14:
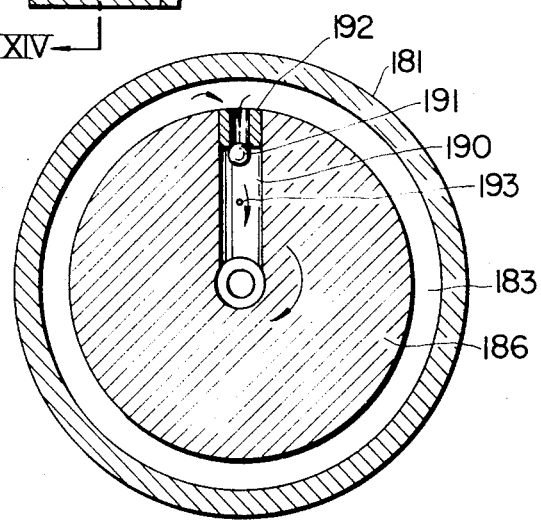
FIG. 14 is a sectional view taken along the line XIV—XIV of FIG. 13.

Referring now to FIGS. 13 and 14, the vehicle speed signal generator 180 comprises an air supply port 182 provided on a body 181, a cylindrical pressure control chamber 183, and an air discharge port 184, and further comprises a shaft 185 which is integrally connected to and rotated with the output shaft 23 of the gear unit mechanism 6, and a disk 186 which is located in the pressure control chamber 183 and is connected to the shaft 185. The supply port 182 is connected to an air passage 189 which is branched from an air passage 188 connected to the pneumatic pressure source 300 and provided with an orifice 187. The disk 186 is provided with a single drain duct 190 in the radial direction from the center, into which a ball 191 is inserted. Furthermore, a pressure control seat 192 is fixed at the outer periphery of the drain duct 190 of the disk 186. In addition, a pin 193 is provided to prevent the ball 191 from dropping too far inwardly in duct 190. The shaft 185 is provided with a through hole 194 for establishing communication between the drain duct 190 and the discharge port 184. Thus, when the air from the pneumatic pressure source 300 is applied to the air passage 188 with the pressure thereof reduced by the orifice 187, the vehicle speed signal generator 180 extracts a part of said air through the air passage 189 and discharges it through the pressure control chamber 183, drain duct 190 and others. The disk 186 is rotated together with the output shaft 23 of the gear unit mechanism 6, and the ball 191 is pressed against the seat 192 due to the centrifugal force resulting from the rotation of the disk 186. The pneumatic pressure signal in the air passage 188 is determined due to the balance between the above-mentioned pneumatic pressure and the ball pressing force. In this case, the centrifugal force being applied to the ball 191 is expressed by $(M/g)rw^2$, where $M$ is the weight of the ball 191, $g$ the acceleration of gravity, $r$ tthe radius of rotation at the center of gravity of the ball, and $w$ the number of rotations of the disk or the like. Let the pneumatic pressure be $Pc$, and the cross sectional area of the pressure control seat 192 be $A$. Then, the force acting to oppose the centrifugal force of the ball 191 will be expressed by $PcA$. As a result, the following formula will be established.

$$Pc = (M/g)(r/A)w^2$$

Figure 15:
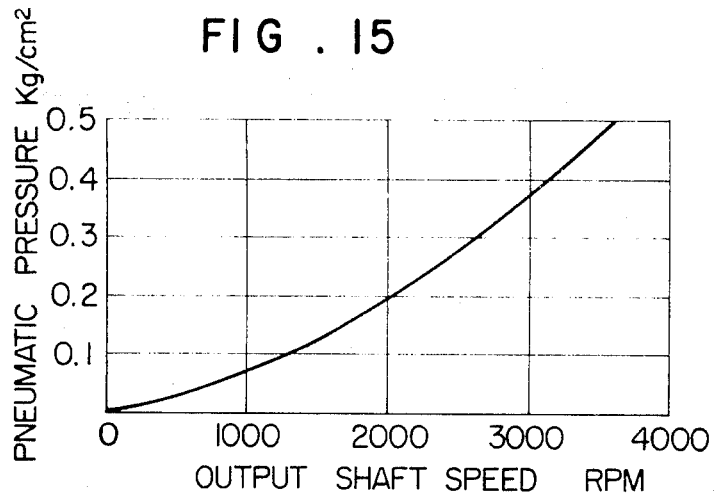
FIG. 15 is a characteristic diagram showing the relationship between the pneumatic pressure signal and the rotational speed of the output shaft.

Based on the above-mentioned formula, the characteristic diagram illustrated in FIG. 15 is obtained. It will be seen that the pneumatic pressure signal is expressed in terms of the square of rotational speed. If rotational speed is low, the force pressing the ball 191 against the seat 192 due to the centrifugal force is weak, and therefore the amount of air to be discharged from the discharge port 184 after passing through the clearance between the ball 191 and the seat 192 is large, thus descreasing the pneumatic pressure signal in the air passage 188. If the rotational speed is high, the ball 191 is strongly pressed against the seat 192 and the amount of air to be discharged is decreased, thus increasing the pneumatic pressure signal in the air passage 188. As described above, the vehicle speed signal generator 180 employs the ball type rotation detecting element by utilizing the centrifugal force produced by the ball, thus converting the vehicle speed to the pneumatic pressure signal. Alternatively, it would be possible to use an eddy current type rotation detecting element in place of the signal generator 180, in keeping with the present invention.

Figure 16:
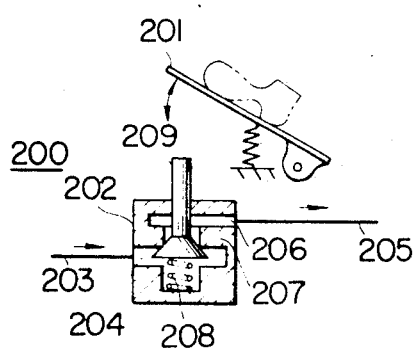
FIG. 16 is a sectional view of a kick-down signal generator.
Figure 17:
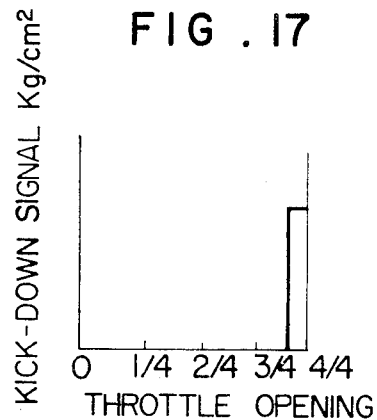
FIG. 17 is a characteristic diagram showing the relationship between the kick-down pneumatic pressure signal and the throttle opening.

Referring next to FIG. 16, the kick-down signal generator 200 is located below a throttle pedal 201. The kick-down signal generator 200 comprises a valve hole 204 which is provided in a body 202 and is connected to the pneumatic pressure source 300 through an air passage 203, and a valve hole 206 for passing the pneumatic pressure signal to an air passage 205. A valve 209 having a spring 208 at the back thereof is provided at a valve seat 207 between said valve holes 206 and 204 so that it is operated when a pedal 201 is depressed to the throttle position. Thus, in the kick-down signal generator 200, the valve 209 is pushed down when the pedal is depressed down to the throttle, and the valve holes 204 and 206 are brought into communication, thus generating the kick-down signal in the air passage 205 as shown in the characteristic diagram of FIG. 17.

Figure 18:
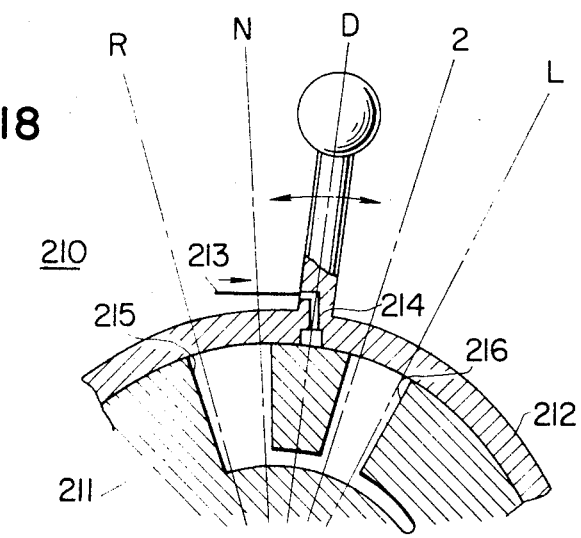
FIG. 18 is a sectional view partially broken away illustrating a shift lever mechanism.
Figure 19:
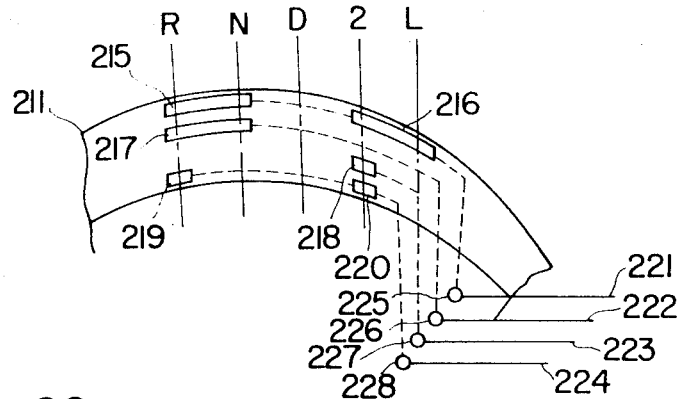
FIG. 19 is a schematic diagram of a portion of the shift lever mechanism.

Referring to FIGS. 18 and 19, the shift lever mechanism 210 comprises a semi-circular core 211 and a shift lever 212 having a handle which is moved along the circumference of the core 211 in conformity with the desired shift position out of five shift positions; R, N, D, 2 and L. The shift lever 212 is provided with an air passage 214 which is connected to the pneumatic pressure source 300 through an air passage 213 and is open over the whole width of the internal circumference. The core 211 is provided with a plurality of passages 215 through 220 which are opened toward the outer circumference and are arranged in four rows. Moreover, provided at the lateral side of the core 211 are four outlets 225 through 228 which are connected to air passages 221 through 224 for transmitting the pneumatic pressure signal conforming to the shift range setting position. In the core 211, the first passage 215 is extended over the shift ranges "R" and "N." The second passage 216 is located in the same row as the passage 215 to extend over the shift ranges "2" and "L." Said two passage 216 and 216 are brought into communication with each other and further with the outlet 225 connected to the air passage 221. The third passage 217 is located in the row next to the passage 215 and is extended over the shift ranges "R" and "N." The third passage 217 is brought into communication with the outlet 226 connected to the air passage 222. The fourth passage 218 is located in the row next to the passage 217 at the shift range "2." Said fourth passage 218 is brought into communication with the outlet 227 connected to the air passage 223. The fifth passage 219 is located in the row next to the passage 218 at the shift range "R." The sixth passage 220 is provided in the same row as the passage 219 at the shift range "2." Said two passages 220 and 219 are brought into communication with each other and further with the outlet 228 connected to the air passage 224. Thus, the shift lever mechanism 210 derives the pneumatic pressure signal to the four air passages 221 through 224 in conformity with the selected shift range by moving the shift lever 212. Namely, in the "N" range, the passage 214 of the shift lever 212 is situated at the "N" range of the core 211 and the pneumatic pressure signal is produced in the air passages 221 and 222 through the first and third passages 215 and 217. In "D" range, the passage 214 is situated at the "D" range of the core 211 and no pneumatic pressure signal is produced in any of the passages. In "2" range, the passage 214 is situated at the "2" range of the core 211, and the pneumatic pressure signal is produced in the air passages 221, 223 and 224 through the second, fourth and sixth passages 216, 218 and 220. In "L" range, the passage 214 is situated at the "L" range of the core 211 and the pneumatic pressure signal is produced in the air passage 221 only through the second passage 216. In "R" range, the passage 214 is situated at the "R" range of the core 211 and the pneumatic pressure signal is produced in the air passages 221, 222 and 224 through the first, third and fifth passages 215, 217 and 219.

The generation of the pneumatic pressure signal in said passages in each shift range is tabulated in Table 3 below. In this Table, the figures represent the reference numerals of the passages, and the words "ON" and "OFF" should be understood to mean "pneumatic pressure signal exists" and "no pneumatic pressure signal exists," respectively.

TABLE 3

|  | 221 | 222 | 223 | 224 |
| --- | --- | --- | --- | --- |
| N range | ON | ON | OFF | OFF |
| D range | OFF | OFF | OFF | OFF |
| 2 range | ON | OFF | ON | ON |
| L range | ON | OFF | OFF | OFF |
| R range | ON | ON | OFF | ON |

Figure 20:
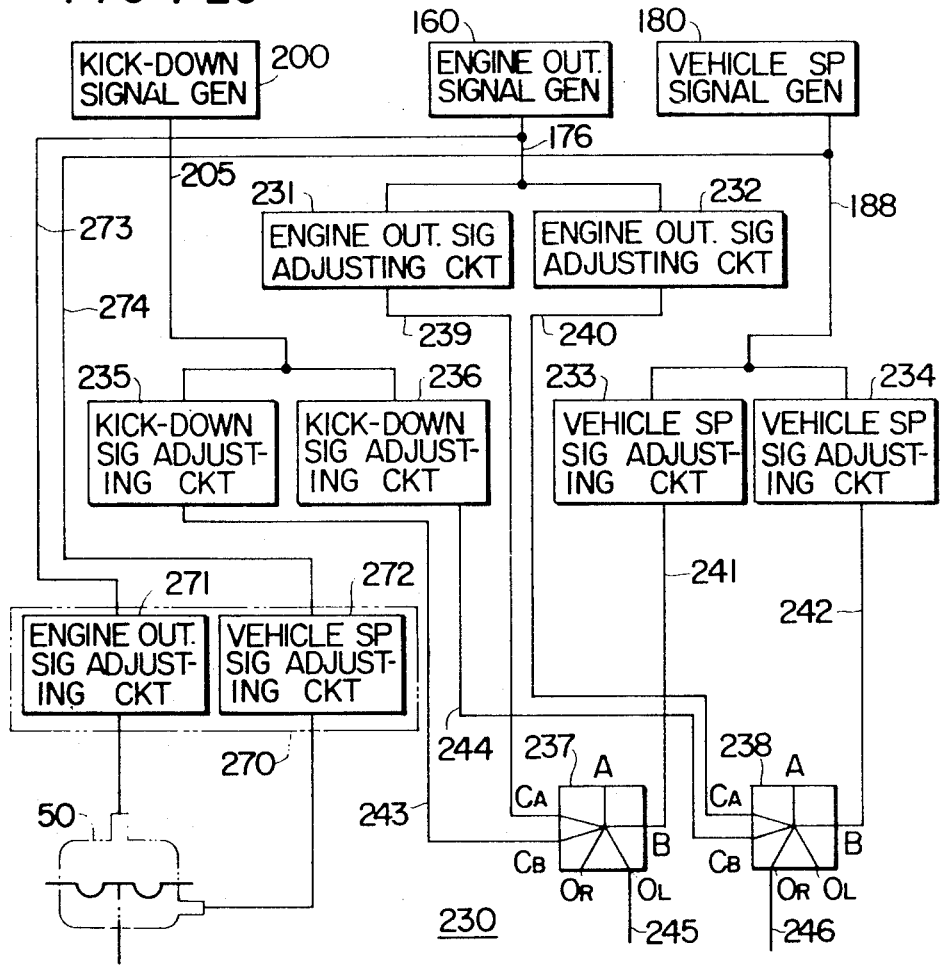
FIG. 20 is a schematic block diagram illustrating the line pressure adjusting mechanism and the automatic shift control mechanism of the present invention.

Referring now to FIG. 20, the line pressure adjusting mechanism 270 comprises resistors, amplifying elements and others, and is provided with an engine output signal adjusting circuit 271 for adjusting the level of pneumatic pressure and a vehicle speed signal adjusting circuit 272. The adjusting circuit 271 is located on an air passage 273 which is branched from the air passage 176 of the engine output signal generator 160 and is connected to the air chamber 53 in the diaphragm element 50 of the hydraulic operating system 30. The adjusting circuit 272 is provided on an air passage which is branched from the air passage 188 of the vehicle speed signal generator 180 and is connected to the air chamber 54 in said diaphragm 50. Thus, the pneumatic pressure signals conforming to the engine output as well as the vehicle speed are adjusted, respectively. The adjusted pneumatic pressure signals are applied to the diaphragm element to, thus obtaining the appropriate line pressures.

The automatic shift control mechanism 230 comprises two engine output signal adjusting circuits 231 and 232 which are connected to the air passage 176 running from the engine output signal generator 160, two vehicle speed signal adjusting circuits 233 and 234 which are connected to the air passage 188 running from the vehicle speed signal generator 180, two kick-down signal adjusting circuits 235 and 236 which are connected to the air passage 205 running from the kick-down signal generator 200, a 1–2 shift operating element 237, and a 2–3 shift operating element 238.

The adjusting circuits 231 through 236 consist of resistors, amplifying circuits and others, respectfully, and are adapted to adjust the pneumatic pressure level. The 1–2 shift operating element 237 and the 2–3 shift operating element 238 utilize bistable, wall-attachment fluidics and comprise, respectively, a power supply port A, an input port B, a control input port $C_A$, another control port $C_B$, an output port $O_R$ and another output port $O_L$, thereby to accomplish OR/NOR operation. The engine output signal adjusting circuits 231 and 232 are connected to the control input ports $C_A$ of the shift operating elements 237 and 238 through the air passages 239 and 240. The vehicle speed signal adjusting circuits 233 and 234 are connected to the input ports B of the shift operating elements 237 and 238 through the air passages 241 and 242. The kick-down signal adjusting circuits 235 and 236 are connected to the control input ports $C_B$ of the shift operating elements 237 and 238 through the air passages 243 and 244. The air passage 245 to the manual shift control mechanism 250 is connected to the output port $O_L$ of the 1–2 shift operating element 237, thus discharging the pressure from the output port $O_R$. The passage 246 to the manual shift control mechanism 250 is connected to the output port $O_R$ of the 2–3 shift operating element 238, thus discharging the pressure from the output port $O_L$. Furthermore, the pressure level of the signal to be adjusted by the engine output signal adjusting circuit 232 is larger than that to be adjusted by the engine output signal adjusting circuit 231 so that the shift calculation in low range and high range can be accomplished separately in the shift operating elements 237 and 238.

Figure 21:
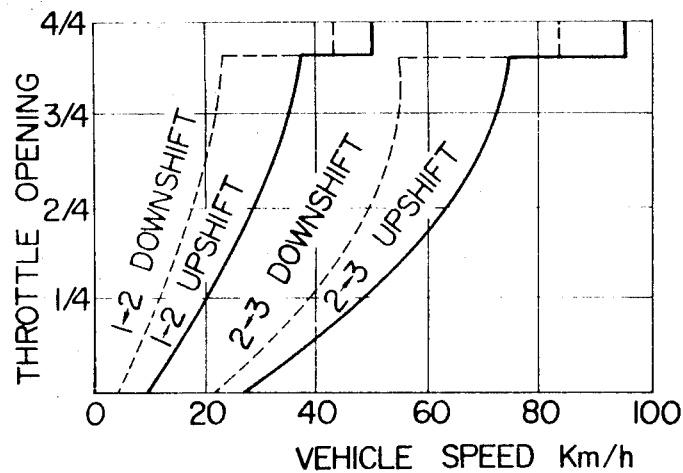
FIG. 21 is a diagram showing the relationship between the throttle opening and the vehicle speed.

The automatic shift control operation of the above-described automatic shift control mechanism 230 in "D" range will be described, and reference should be made to the characteristic vehicle operation diagram of FIG. 21. In first gear, the pneumatic pressure signal conforming to the engine output is larger than that conforming to the vehicle speed in both shift operating elements 237 and 238. Accordingly, an output is generated at output port $O_L$ by comparing both said pneumatic pressure signals, thus producing the pneumatic pressure signal in the air passage 245. In second gear, the pneumatic pressure signal conforming to the engine output becomes smaller than that conforming to the vehicle speed in the 1–2 shift operating element 237, thus producing an output at the output port $O_R$. In the 2–3 shift operating element 238, however, the pneumatic pressure signal conforming to the engine output is larger than that conforming to the vehicle speed, and an output is produced at the output port $O_L$. Accordingly, the pressure is discharged from both output ports. In third gear, the pneumatic pressure signal conforming to the engine output becomes smaller than that conforming to the vehicle speed in both shift operating elements 237 and 238, generating an output at the output port $O_R$. Accordingly, the pneumatic pressure signal is produced in the air passage 246. The above-described shift control operation with respect to the turning on or off of the pneumatic pressure signal is tabulated in Table 4. In this Table, the figures represent the reference numerals of the air passages.

TABLE 4

| D range | 245 | 246 |
| --- | --- | --- |
| 1st gear | ON | OFF |
| 2nd gear | OFF | OFF |
| 3rd gear | OFF | ON |

In "D" range second or third gear, the pneumatic pressure signal for kick-down shift is produced by full throttling. This signal is adjusted as described above and applied to the shift operating elements 237 and 238. Accordingly, when the pneumatic pressure signal is produced in the "D" range second gear, this signal is added to the above-described pneumatic pressure signal of the engine output in the 1–2 shift operating element 237. Therefore, the relationship between the pneumatic pressure signals is reversed and an output is produced at the output port $O_L$. However, in the 2—3 shift operating element 238, the same relationship as described hereinbefore is maintained and an output is produced at the output port $O_L$ in the same manner as in the case of second gear, thus accomplishing kick-down shift to the first gear. When the pneumatic pressure signal is produced in "D" range third gear, the pneumatic pressure signal conforming to the vehicle speed is far larger than that conforming to the engine output in the 1–2 shift operating element 237, and therefore the relationship between said two signals remains unchanged even if the pneumatic pressure signal of kick-down is added. Accordingly, an output is produced at the output port $O_R$. In the 2–3 shift operating element 238, the relationship between two pneumatic pressure signals is reversed due to the addition of the pneumatic pressure signal of kick-down, thus producing an output at the output port $O_L$. Accordingly, kick-down shift to the second gear is accomplished.

As described so far, the automatic shift control mechanism 230 determines each gear shift in "D" range automatically by comparing the relationship between the pneumatic pressure signal conforming to the engine output and that conforming to the vehicle speed. This shift control mechanism 230 can operate in other ranges than "D," that is, in "N," "2," "L" and "R" ranges. However, the operation of the system 230 in other ranges than "D" does not have any effect on the manual shift control mechanism 250, and therefore the description of such operation is omitted.

Figure 22:
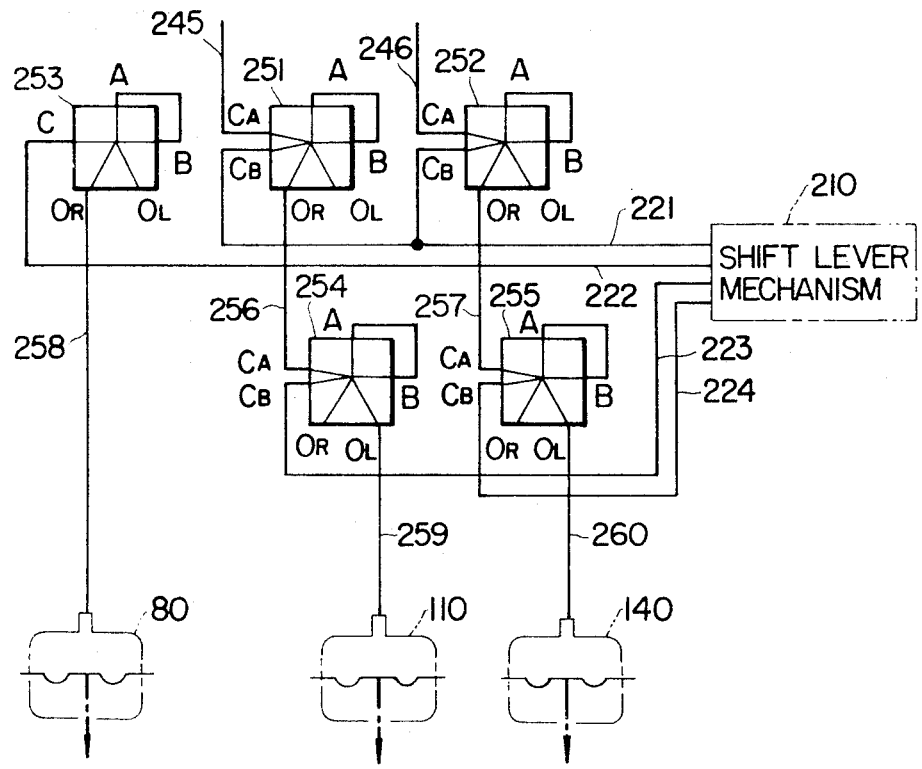
FIG. 22 is a schematic block diagram illustrating the manual shift control mechanism of the present invention.

Referring last to FIG. 22, the manual shift control mechanism 250 comprises five elements 251 through 255 utilizing bistable, wall-attachment fluidics. Each of the first, second, fourth and fifth elements 251, 252, 254 and 255 is provided with a power supply port A, a control input port $C_A$, another control port $C_B$, an output port $O_R$ and another output port $O_L$. The bias port B is connected to the power supply port A, thereby to perform OR/NOR operation. The third element 253 is provided with a power supply port A, a control port C, and output ports $O_R$ and $O_L$. The bias port B is connected to the power supply port A. The control input ports $C_A$ of the first and second elements 251 and 252 are connected to the air passages 245 and 246 of said automatic shift control mechanism 230, respectively, and the contol input ports $C_B$ thereof are connected to the air passage 221 of the shift lever mechanism 210. Furthermore, the output ports $O_R$ thereof are connected to the control input ports $C_A$ of the fourth and fifth elements 254 and 255 through the air passages 256 and 257, thus discharging pressure from the output ports $O_L$. The control input port C of the third element 253 is connected to the air passage 222 of the shift lever mechanism 210, and the output port $O_R$ thereof is connected to the diaphragm element 80 of the hydraulic operating system 30 through the air passage 258, thus discharging pressure from the output port $O_L$. The control input port $C_B$ of the fourth element 254 is connected to the air passage 223 of the shift lever mechanism 210, and the outport $O_L$ thereof is connected to diaphragm element 110 of the hydraulic operating system 30 through the air passage 259, thus discharging pressure from the output port $O_R$. The control input port $C_B$ of the fifth element 255 is connected to the air passage 224 of the shift lever mechanism 210, and the output port $O_L$ thereof is connected to the diaphragm element 140 of the hydraulic operating system 30 through the air passage 260, thus discharging pressure from the output port $O_R$.

The operation of the above-described manual shift control mechanism 250 in each shift range will be described with reference to Tables 3 and 4.

In "N" range, the pneumatic pressure signal exists at the air passages 221 and 222, but not at the air passages 223 and 224. Accordingly, the third element 253 derives an output at the output port $O_L$ to shut off the pneumatic pressure signal of the air passage 258 and to release the diaphragm element 80. In the first and second elements 251 and 252, there exist inputs at the control input ports $C_B$ thereof, and therefore inputs are derived at the output ports $O_L$, regardless of whether the input from the automatic shift control mechanism 230 exists, thus shutting off the pneumatic pressure signal in the air passages 256 and 257. As a result, no input exists at the control input ports $C_A$ of the fourth and fifth elements 254 and 255. At the same time, there exists no input at the control input ports $C_B$. Accordingly, outputs are derived at the output ports $O_R$, thus shutting off the pneumatic pressure signal in the air passages 259 and 260 and releasing the diaphragm elements 110 and 140.

In "D" range, there exists no pneumatic pressure signal at any of the air passages 221 through 224. At this time, in first gear range, the pneumatic pressure signal exists at the air passage 245 but not at the air passage 246. Accordingly, the third element 253 derives an output at the output port $O_R$ thereof. Thus, the diaphragm element 80 is operated by means of the pneumatic pressure signal in the air passage 258. In the first element 251, an input exists at the control input port $C_A$ but not at the control input port $C_B$. Accordingly, an output is derived at the output port $O_L$ to shut off the pneumatic pressure signal of the air passage 256. In the second element 252, an input does not exist at the control input ports $C_A$ and $C_B$, and therefore an output is derived at the output port $O_R$, thus obtaining the pneumatic pressure signal at the air passage 257. As a result, the fourth element 254 derives an output at the output port $O_R$, because there exists no input at the control input ports $C_A$ and $C_B$, thus shutting off the pneumatic pressure signal of the air passage 259 and releasing the diaphragm element 110. In the fifth element 255, an input exists at the control input port $C_A$ but not at the control input port $C_B$, and therefore an output is obtained at the output port $O_L$. Accordingly, the pneumatic pressure signal is produced in the air passage 260 and the diaphragm element 140 is operated. In second gear, no pneumatic pressure signal exists at the air passages 245 and 246. Accordingly, the third element 253 operates the diaphragm element 80 in the same manner as described above. In the first and second elements 251 and 252, no input exists at the control input ports $C_A$ and $C_B$, and therefore outputs are derived at the output ports $O_R$, thus producing the pneumatic pressure signal in the air passages 256 and 257. As a result, in the fourth and fifth elements 254 and 255, inputs exist at the control input ports $C_A$ but not at the input ports $C_B$. Accordingly, outputs are derived at the output port $O_L$, thus operating the diaphragm elements 110 and 140 by means of the pneumatic pressure signals in the air passages 259 and 260, respectively. In third gear, the pneumatic pressure signal does not exist in the air passage 245 but exists at the air passage 246. Accordingly, the third element 253 operates the diaphragm element 80 in the same manner as described above. The first and second elements 251 and 252 are operated in the reverse manner as in first gear to produce the pneumatic pressure signal in the air passage 256 and to shut off the pneumatic pressure signal in the air passage 257. As a result, the fourth and fifth elements 253 aand 255 operate in the reverse manner as in first gear, thus operating the diaphragm element 110 by means of the pneumatic pressure signal of the air passage 259 and shutting off the pneumatic pressure signal of the air passage 260 to release the diaphragm element 140.

In "2" range, the pneumatic pressure signal exists in the air passages 221, 223 and 224 but not in the air passage 222. Accordingly, the third element 253 operates the diaphragm element 80 in the same manner as in "D" range. In the first and second elements 251 and 252, the inputs exist at the control input ports $C_B$ in the same manner as in "N" range, thus shutting off the pneumatic pressure signal of the air passages 256 and 257, regardless of whether the input from the automatic shift control mechanism 230 exists or not. In the fourth and fifth elements 254 and 255, inputs exist at the control input ports $C_B$ thereof, and outputs are derived at the output ports $O_L$, regardless of the first and second elements 251 and 252. Accordingly, the diaphragm elements 110 and 140 are operated by means of the pneumatic pressure signals in the air passages 259 and 260. Thus, in "2" range, the same state as in "D" range will be obtained.

In "L" range, the pneumatic pressure signal exists at the air passage 221 only but not at the air passages 222 through 224. Accordingly, the third element 253 operates the diaphragm element 80 in the same range as "D" range. The first and second elements 251 and 252 shut off the pneumatic pressure signal in the air passages 256 and 257 in the same manner as in the "N" range. As a result, no input exists at the control input ports $C_A$ and $C_B$ of the fourth and fifth elements 254 and 255, and therefore outputs are derived at the output ports $O_R$, thus shutting off the pneumatic pressure signals in the air passages 259 and 260 and releasing the diaphragm elements 110 and 140.

In "R" range, the pneumatic pressure signal exists at the air passages 221, 222 and 224 but not at the air passage 223. Accordingly, the third element 253 releases the diaphragm element 80 in the same manner as in "N" range. The first and second elements 251 and 252 shut off the pneumatic pressure signals in the air passages 256 and 257 in the same manner as in "N" range. As a result, the fourth element 254 derives an output at the output port $O_R$, because no input exists at the control input ports $C_A$ and $C_B$, thus shutting off the pneumatic pressure signal in the air passage 259 and releasing the diaphragm element 110. In the fifth element 255, the input exists at the control input port $C_B$ but not at the control input port $C_A$, and therefore the pneumatic pressure signal is produced in the air passage 260, thus operating the diaphragm element 140.

As described above, the manual shift control mechanism 250 shuts off the pneumatic pressure signals passed from the automatic shift control mechanism 230 by means of the first and second elements 251 and 252 in each of "N," "2," "L" and "R" ranges, and produces shift pneumatic pressure signals in the diaphragm elements 80, 110 and 140 of the hydraulic operating system 30 by means of the pneumatic pressure signals from the shift lever mechanism 210 in conformity with the selected shift range. In addition, in "D" range, the manual shift control mechanism 250 amplifies the pneumatic pressure signal derived from the automatic shift control mechanism 230 under the condition where no pneumatic pressure signal from the shift lever mechanism 210 exists. Thus, the same results as shown in Table 2, referred to in describing the operation of the hydraulic operating system 30, will be obtained.

As described hereinbefore, the hydraulic control system according to this invention comprises the hydraulic operating system 30 having the shift valves 61, 90 and 120 to be controlled by the diaphragm elements 80, 110 and 140; the pneumatic control system 150 consisting of the engine output signal generator 160, the vehicle speed signal generator 180, the kick-down signal generator 200, the shift lever mechanism 210, the automatic and manual shift control mechanisms 230 and 250 having the fluid logic elements, and the line pressure adjusting mechanism 270; and the pneumatic pressure source 300, thus controlling the transmission 1 having variable change gear ratios by means of the pneumatic pressure signals. As the control system according to this invention is of the pneumatic type, it is highly resistant to heat and vibration, more reliable in operation and easier in maintenance in comparison with electric type control systems. Furthermore, when compared with hydraulic type control systems, the system according to this invention is simpler in construction and can perform complicated control with high degree of accuracy. Moreover, as the calculation of shift patterns is carried out by utilizing fluid logic elements, the magnitude of the pneumatic pressure signal derived from the shift lever mechanism need not be as large. Comparatively weak signals would be enough if On or OFF conditions of such signals can be identified. Thus, signal lag due to the length of piping will pose no problem, and therefore ease of handling will be ensured. In addition, from the standpoint of construction, the shift lever link can be eliminated.

While specific embodiments of the invention have been shown and described in detail to illustrate the application of the inventive principles, it will be understood that the invention may be embodied otherwise without departing from such principles.

What is claimed is:

1. In a vehicle transmission automatic control system for a vehicle comprising an engine, gear transmission means for applying power from said engine to drive said vehicle, said transmission means including means operable to effect variable gear change ratios, the combination comprising hydraulic servo mechanisms operable to selectively change gear ratios in said transmission means, a hydraulic operating system including valve means shiftable in response to pneumatic signals applied thereto for controlling operation of said hydraulic servo mechanisms, and a pneumatic control system responsive to vehicle operating conditions to generate pneumatic signals which are applied to said hydraulic operating system for selectively controlling operation of said gear transmission means.

2. A control system according to claim 1 for wherein said pneumatic control system comprises an engine output signal generator for developing a pneumatic signal representative of the output of said engine, a vehicle speed signal generator for developing a pneumatic signal representative of the speed of said vehicle, and fluid logic means having said engine output pneumatic signal and said vehicle speed pneumatic signal applied hereto as inputs for generating output pneumatic signals representative of the relationship between said input signals, said output pneumatic signals being applied to said hydraulic operating system to effect automatic control of said transmission means in accordance with the existing relationship between engine output and vehicle speed.

3. A control system according to claim 2 wherein said pneumatic control system includes a lever shift mechanism operable to be placed by a vehicle operator in a selectable one of a plurality of vehicle operating positions for development of an output pneumatic signal representative of said selected operating position, said output pneumatic signal being applied to said fluid logic means to determine the responsiveness of said fluid logic means to said engine output and vehicle speed pneumatic input signals in accordance with the selected position of said lever shift mechanism thereby to effect manual or automatic operation of said transmission means.

4. A control system according to claim 3 wherein said fluid logic means comprise an automatic shift control mechanism having said engine output pneumatic signal and said vehicle speed pneumatic signal applied thereto as inputs and operable to generate output pneumatic signals representative of the relationship between said inputs, a manual shift control mechanism having applied thereto as inputs the output pneumatic signals from said automatic shift control mechanism and the output pneumatic signal from said lever shift mechanism, said manual shift control mechanism being operable in response to said applied inputs to develop output pneumatic signals which are applied to said hydraulic operating system to effect vehicle operation as determined by the setting of said lever shift mechanism.

5. A control system according to claim 4 wherein said lever shift mechanism comprises a selectable position for automatic operation of said transmission means and a plurality of selectable positions for manual operation of said transmission means, said manual shift control mechanism operating when said lever mechanism is in said automatic position to effect automatic variation of the gear ratios of said transmission means in accordance with a comparison signal of said vehicle speed and said engine output generated by said automatic shift control mechanism, said manual shift control mechanism operating when said lever mechanism is in any of said manual positions to render said comparison signal ineffectual for operating said transmission means and to effect operation of said transmission means in accordance with the output pneumatic signal from said lever shift mechanism determined by the selected manual operating position thereof.

6. A control system according to claim 5 for a vehicle comprising an accelerator pedal operative to effect control of said engine output, said system comprising a kickdown signal generator generating an output pneumatic signal in response to selected movement of said accelerator pedal, said output signal being applied through said fluid logic means to said hydraulic operating system when said lever shift mechanism is in said automatic position to effect downshifting of said transmission means.

7. A control system according to claim 1 wherein said hydraulic operating system comprises hydraulic fluid chamber means for permitting passage of hydraulic fluid therethrough, with said shiftable valve means being movable within said chamber means to control fluid flow therethrough, diaphragm means movable in response to pneumatic pressure signals applied thereto and operably connected with said shiftable valve means to effect selected movement thereof in response to said pneumatic signals, and means for selectively connecting said chamber means in fluid flow relationship with said servo mechanisms to control operation of said transmission means by selected application of said pneumatic signals.

8. A control system according to claim 7 wherein said diaphragm means connected with said shiftable valve means control selective operation of said servo mechanisms in automatic shift and in manual shift.

9. A control system according to claim 2 comprising a pneumatic pressure source wherein said engine output signal generator comprises diaphragm means movable in response to pressure levels applied thereto, valve means operable in accordance with positioning of said diaphragm means; means connecting said engine output signal generator to the intake manifold of said engine to control movement of said diaphragm means in accordance with pressure levels in said intake manifold, and passage means connecting said pneumatic pressure source to said fluid logic means through said valve means, said valve means controlling the level of the pneumatic output signal of said engine output signal generator which is applied to said fluid logic means in accordance with the output of said engine as represented by the pressure level within said intake manifold.

10. A control system according to claim 2 comprising a pneumatic pressure source wherein said vehicle speed signal generator comprises valve body means having a radially extending fluid flow channel and connected to rotate with the output shaft of said gear transmission means thereby to effect a speed of rotation commensurate with vehicle speed, ball valve means movable by centrifugal force within said radial channel in accordance with the rotational speed of said valve body means to control the level of fluid flow therethrough, and means connecting said pneumatic pressure source to said fluid logic means through said radial channel to control the level of the pneumatic output signal of said vehicle speed signal generator in accordance with vehicle speed.

11. A control system according to claim 3 including a pneumatic pressure source wherein said lever shift mechanism comprises a plurality of fluid channels operable to interconnect said pneumatic pressure source with selected elements of said fluid logic means, and means for selectable blocking said fluid channels in accordance with the position of said lever mechanism thereby to apply to said logic means pneumatic signals to determine automatic or manual operation of said transmission means in accordance with the setting of said lever mechanism.

12. A control system according to claim 6 including a pneumatic pressure source wherein said kick-down signal generator comprises valve means operable to interconnect said pneumatic pressure source with said fluid logic means said valve means being responsive to the position of said accelerator pedal to block fluid flow when said pedal is in a first position and to enable fluid flow when said pedal is in positions other than said first position thereby to apply to said logic means a pneumatic signal operative to effect downshift of said transmission means.

13. A control system according to claim 2 wherein said control system comprises fluid logic means having at least two control ports opposite to each other to which are applied respectively a pneumatic signal representative of said vehicle speed and a pneumatic signal representative of said engine output as inputs, the relationship between said input signals determining the pattern of automatic control of said transmission.

14. A control system according to claim 5 wherein said manual shift control mechanism comprises fluid logic means for developing pneumatic output signals for controlling operation of shift valve means in accordance with application thereto of pneumatic input signals.

15. A control system according to claim 2 wherein said hydraulic operating system has operably connected therewith a hydraulic pressure regulating unit responsive to a comparison between said vehicle speed pneumatic signal and said engine output pneumatic signal to regulate the fluid pressure in said hydraulic operating system in accordance with said comparison.

16. A control system according to claim 15 including a source of hydraulic operating fluid wherein said hydraulic pressure regulating unit comprises hydraulic fluid chamber means in flow communication between said hydraulic fluid source and said hydraulic operating system, valve means movable within said chamber means to control fluid flow therethrough, diaphragm means movable in response to pneumatic pressure signals and operably connected with said valve means to effect selected movement thereof in response to said pneumatic signals, and means for applying to said diaphragm means pneumatic pressure signals representative, respectively, of vehicle speed and engine output thereby to move said diaphragm means in response to a comparison of said applied pneumatic signals and to drive said valve means in response thereto to regulate hydraulic fluid pressure in said hydraulic control system.

17. A control system according to claim 2 wherein said fluid logic means include pneumatic pressure adjusting means for amplifying and adjusting the pressure levels of pneumatic signals transmitted therethrough.

* * * * *